(12) United States Patent
Chang et al.

(10) Patent No.: US 11,982,527 B2
(45) Date of Patent: May 14, 2024

(54) SYSTEMS AND METHODS OF IMAGING WITH MULTI-DOMAIN IMAGE SENSOR

(71) Applicant: QUALCOMM Incorporated, San Diego, CA (US)

(72) Inventors: Yun-Chieh Chang, San Diego, CA (US); Jing Wang, Saratoga, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/932,267

(22) Filed: Sep. 14, 2022

(65) Prior Publication Data

US 2024/0085169 A1 Mar. 14, 2024

(51) Int. Cl.
*G01J 3/28* (2006.01)
*G01B 9/02* (2022.01)
*G02B 27/10* (2006.01)
*H04N 23/55* (2023.01)

(52) U.S. Cl.
CPC ........ *G01B 9/02044* (2013.01); *G01J 3/2823* (2013.01); *G02B 27/1066* (2013.01); *H04N 23/55* (2023.01); *G01J 2003/2826* (2013.01); *G01J 2003/2836* (2013.01); *G01J 2003/2843* (2013.01)

(58) Field of Classification Search
CPC ................ G01B 9/02044; G01J 3/2823; G01J 2003/2826; G01J 2003/2836; G01J 2003/2843
See application file for complete search history.

(56) References Cited

U.S. PATENT DOCUMENTS

| | | | |
|---|---|---|---|
| 2012/0268635 A1* | 10/2012 | Furuta | H04N 9/646 348/E5.091 |
| 2023/0040707 A1* | 2/2023 | Richards | G06T 7/73 |
| 2023/0074718 A1* | 3/2023 | Smits | H04N 23/76 |

* cited by examiner

*Primary Examiner* — Jonathan M Hansen
(74) *Attorney, Agent, or Firm* — Polsinelli/Qualcomm

(57) ABSTRACT

Imaging systems and techniques are described. An imaging system determines, based on image data of a scene received from an image sensor, a first plurality of pixel values corresponding to a first electromagnetic (EM) frequency domain and a second plurality of pixel values corresponding to a second EM frequency domain. The imaging system reduces the first plurality of pixel values using a plurality of cross-domain contamination values (based on the second plurality of pixel values) to generate a third plurality of pixel values. The imaging system determines a reconstructed pixel value based on a combination of at least an overexposed pixel value of the first plurality of pixel values and a corresponding pixel of the third plurality of pixel values. The imaging system outputs a reconstructed image that includes the reconstructed pixel value and a subset of the third plurality of pixel values.

29 Claims, 12 Drawing Sheets

SYSTEMS AND METHODS OF IMAGING WITH MULTI-DOMAIN IMAGE SENSOR

FIELD

This application is related to image capture and processing. More specifically, this application relates to systems and methods of processing image data from a multi-domain image sensor that is configured to capture different electromagnetic frequency domains, such as visible light and infrared, including to reduce cross-domain contamination and reconstruct highlights.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Photodetectors can be sensitive to light from a given electromagnetic (EM) frequency domain, such as the visible light EM frequency domain, allowing the corresponding image sensor to capture images in the given EM frequency domain.

BRIEF SUMMARY

In some examples, systems and techniques are described for image processing. An imaging system determines, based on image data of a scene received from an image sensor, a first plurality of pixel values corresponding to a first electromagnetic (EM) frequency domain (e.g., visible light) and a second plurality of pixel values corresponding to a second EM frequency domain (e.g., infrared (IR)). The imaging system reduces the first plurality of pixel values using a plurality of cross-domain contamination values to generate a third plurality of pixel values (e.g., contamination-corrected pixel values). The plurality of cross-domain contamination values are based on the second plurality of pixel values. The imaging system determines a reconstructed pixel value based on a combination (e.g., a weighted average) of at least an overexposed pixel value of the first plurality of pixel values and a corresponding pixel of the third plurality of pixel values. The imaging system outputs a reconstructed image. The reconstructed image includes the reconstructed pixel value and a subset of the third plurality of pixel values.

In one example, an apparatus for media processing is provided. The apparatus includes a memory and one or more processors (e.g., implemented in circuitry) coupled to the memory. The one or more processors are configured to and can: determine, based on image data of a scene received from an image sensor, a first plurality of pixel values corresponding to a first electromagnetic (EM) frequency domain and a second plurality of pixel values corresponding to a second EM frequency domain; reduce the first plurality of pixel values using a plurality of cross-domain contamination values to generate a third plurality of pixel values, wherein the plurality of cross-domain contamination values are based on the second plurality of pixel values; determine a reconstructed pixel value based on a combination of at least an overexposed pixel value of the first plurality of pixel values and a corresponding pixel of the third plurality of pixel values; and output a reconstructed image, wherein the reconstructed image includes the reconstructed pixel value and a subset of the third plurality of pixel values.

In another example, a method of image processing is provided. The method includes: determining, based on image data of a scene received from an image sensor, a first plurality of pixel values corresponding to a first electromagnetic (EM) frequency domain and a second plurality of pixel values corresponding to a second EM frequency domain; reducing the first plurality of pixel values using a plurality of cross-domain contamination values to generate a third plurality of pixel values, wherein the plurality of cross-domain contamination values are based on the second plurality of pixel values; determining a reconstructed pixel value based on a combination of at least an overexposed pixel value of the first plurality of pixel values and a corresponding pixel of the third plurality of pixel values; and outputting a reconstructed image, wherein the reconstructed image includes the reconstructed pixel value and a subset of the third plurality of pixel values.

In another example, a non-transitory computer-readable medium is provided that has stored thereon instructions that, when executed by one or more processors, cause the one or more processors to: determine, based on image data of a scene received from an image sensor, a first plurality of pixel values corresponding to a first electromagnetic (EM) frequency domain and a second plurality of pixel values corresponding to a second EM frequency domain; reduce the first plurality of pixel values using a plurality of cross-domain contamination values to generate a third plurality of pixel values, wherein the plurality of cross-domain contamination values are based on the second plurality of pixel values; determine a reconstructed pixel value based on a combination of at least an overexposed pixel value of the first plurality of pixel values and a corresponding pixel of the third plurality of pixel values; and output a reconstructed image, wherein the reconstructed image includes the reconstructed pixel value and a subset of the third plurality of pixel values.

In another example, an apparatus for image processing is provided. The apparatus includes: means for determining, based on image data of a scene received from an image sensor, a first plurality of pixel values corresponding to a first electromagnetic (EM) frequency domain and a second plurality of pixel values corresponding to a second EM frequency domain; means for reducing the first plurality of pixel values using a plurality of cross-domain contamination values to generate a third plurality of pixel values, wherein the plurality of cross-domain contamination values are based on the second plurality of pixel values; means for determining a reconstructed pixel value based on a combination of at least an overexposed pixel value of the first plurality of pixel values and a corresponding pixel of the third plurality of pixel values; and means for outputting a reconstructed image, wherein the reconstructed image includes the reconstructed pixel value and a subset of the third plurality of pixel values.

In some aspects, the plurality of cross-domain contamination values are based on a combination of the second plurality of pixel values and at least one corresponding coefficient. In some aspects, the combination of the second plurality of pixel values and at least one corresponding coefficient is a product of the second plurality of pixel values and at least one corresponding coefficient. In some aspects, the combination is a weighted average of at least the overexposed pixel value of the first plurality of pixel values and the corresponding pixel of the third plurality of pixel values.

In some aspects, a position of the corresponding pixel in a frame that includes the third plurality of pixel values matches a position of the overexposed pixel value in a frame that includes the first plurality of pixel values.

In some aspects, one or more of the methods, apparatuses, and computer-readable medium described above further comprise: determining that the overexposed pixel value exceeds an overexposure threshold to determine that the overexposed pixel value is overexposed.

In some aspects, the first EM frequency domain includes at least a subset of a visible light EM frequency domain, and wherein the second EM frequency domain includes at least a subset of an infrared (IR) EM frequency domain.

In some aspects, determining, based on the image data, a fourth plurality of pixel values corresponding to a third EM frequency domain, wherein the combination is of at least the overexposed pixel value, the corresponding pixel of the third plurality of pixel values, and a corresponding pixel of the fourth plurality of pixel values.

In some aspects, the first EM frequency domain includes at least a subset of a first color of a visible light EM frequency domain, wherein the third EM frequency domain includes at least a subset of a second color of the visible light EM frequency domain, and wherein the second EM frequency domain includes at least a subset of an infrared (IR) EM frequency domain. In some aspects, the first EM frequency domain includes at least a subset of an infrared (IR) EM frequency domain, and wherein the second EM frequency domain includes at least a subset of a visible light EM frequency domain.

In some aspects, one or more of the methods, apparatuses, and computer-readable medium described above further comprise: reducing the second plurality of pixel values using a second plurality of cross-domain contamination values to generate a fourth plurality of pixel values, wherein the second plurality of cross-domain contamination values are based on the first plurality of pixel values; determining a second reconstructed pixel value based on a combination of at least a second overexposed pixel value of the second plurality of pixel values and a corresponding pixel of the fourth plurality of pixel values; and outputting a second reconstructed image, wherein the second reconstructed image includes the second reconstructed pixel value and a subset of the fourth plurality of pixel values.

In some aspects, one or more of the methods, apparatuses, and computer-readable medium described above further comprise: the image sensor. In some aspects, the image sensor is configured to capture both the image data based on incident light from the scene, the incident light including both light from the first EM frequency domain and light from the second EM frequency domain.

In some aspects, one or more of the methods, apparatuses, and computer-readable medium described above further comprise: detecting at least one object in the reconstructed image; and transmitting a vehicle control signal to a vehicle control device of a vehicle, cause the vehicle control device to route the vehicle based on detection of the at least one object. In some aspects, one or more of the methods, apparatuses, and computer-readable medium described above further comprise: detecting at least one object in the reconstructed image; and transmitting an alert signal to a vehicle output device of a vehicle, cause the vehicle output device to output an alert that is indicative of detection of the at least one object.

In some aspects, one or more of the methods, apparatuses, and computer-readable medium described above further comprise: causing a display to display the reconstructed image. In some aspects, one or more of the methods, apparatuses, and computer-readable medium described above further comprise: causing a communication transceiver to transmit the reconstructed image to a recipient device.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
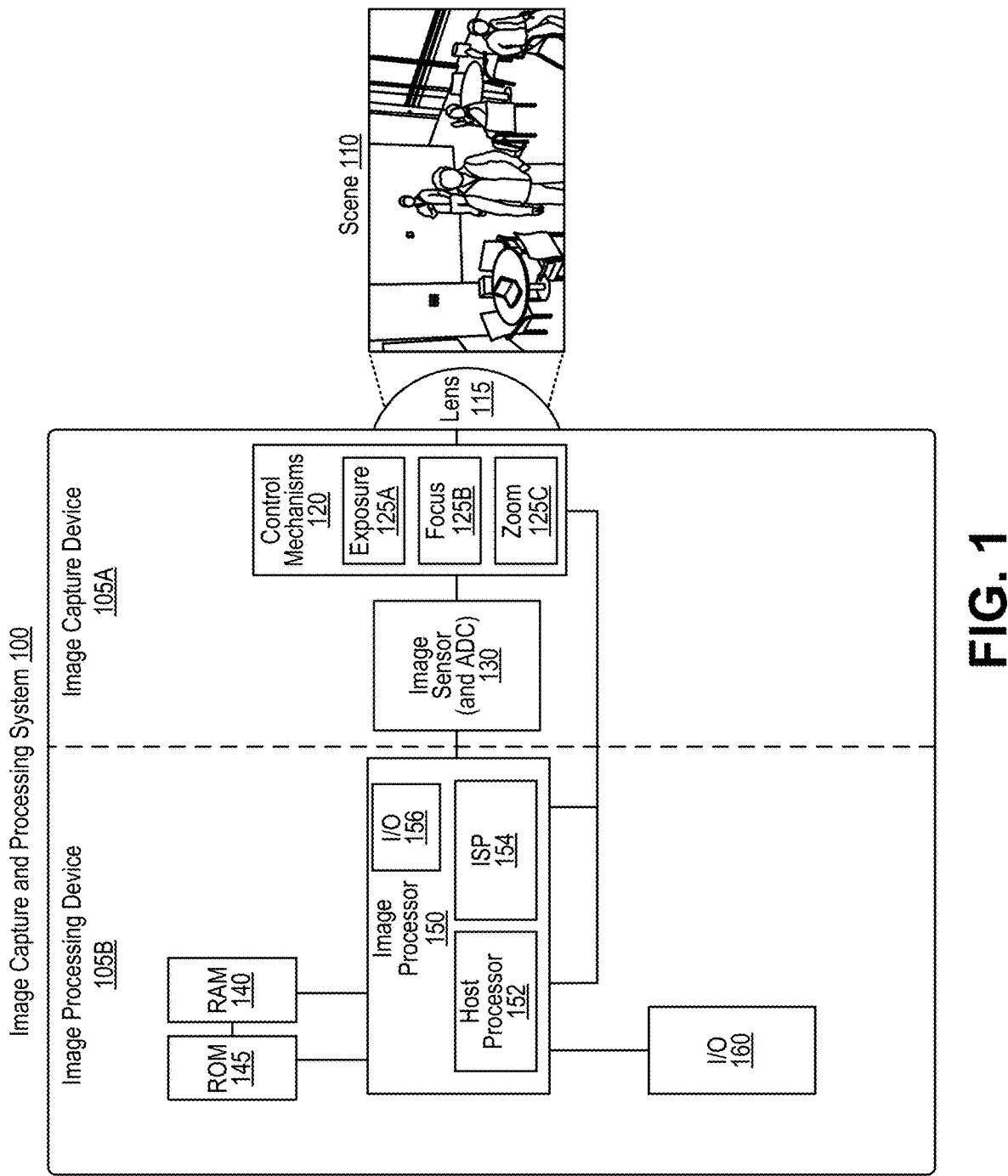
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A camera can capture images using an image sensor of the camera, which can include an array of photodetectors. Photodetectors can be sensitive to light from a given electromagnetic (EM) frequency domain, such as the visible light EM frequency domain, allowing the corresponding image sensor to capture images in the given EM frequency domain.

In some examples, systems and techniques are described for image processing. An imaging system determines, based on image data of a scene received from an image sensor, a first plurality of pixel values corresponding to a first electromagnetic (EM) frequency domain (e.g., visible light) and a second plurality of pixel values corresponding to a second EM frequency domain (e.g., infrared (IR)). The imaging system reduces the first plurality of pixel values using a plurality of cross-domain contamination values to generate a third plurality of pixel values (e.g., contamination-corrected pixel values). The plurality of cross-domain contamination values are based on the second plurality of pixel values. The imaging system determines a reconstructed pixel value based on a combination (e.g., a weighted average) of at least an overexposed pixel value of the first plurality of pixel values and a corresponding pixel of the third plurality of pixel values. The imaging system outputs a reconstructed image. The reconstructed image includes the reconstructed pixel value and a subset of the third plurality of pixel values.

The imaging systems and techniques described herein provide a number of technical improvements over prior imaging systems. For instance, the imaging systems and techniques described herein provide improved image quality for systems with multi-domain image sensors, since both cross-domain contamination reduction and highlight reconstruction improve image quality. For instance, the imaging system performing cross-domain contamination reduction reduces or removes visual artifacts from images in the first EM frequency domain caused by image data from the second EM frequency domain that the image sensor is also sensitive to. The imaging system performing highlight reconstruction can correct visual artifacts (e.g., discontinuities in areas that should appear smooth, flat-looking portions of in areas that should be textured or have a gradient) in highlights of an image that may be caused by cross-domain contamination reduction in situations where the input image included pixels with overexposure in at least one color channel. The imaging system performing cross-domain contamination reduction and highlight reconstruction allows the imaging system to generate images with colors and luminosities that appear more accurate to a real-world view of a scene than before application of these processes, and allows the imaging system to use a combination of different EM frequency domains to optimally use visual information that might be missing in one of the EM frequency domains.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210 discussed with respect to the computing system 1200. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1220, read-only memory (ROM) 145 and/or 1225, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1235, any other input devices 1245, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1202.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
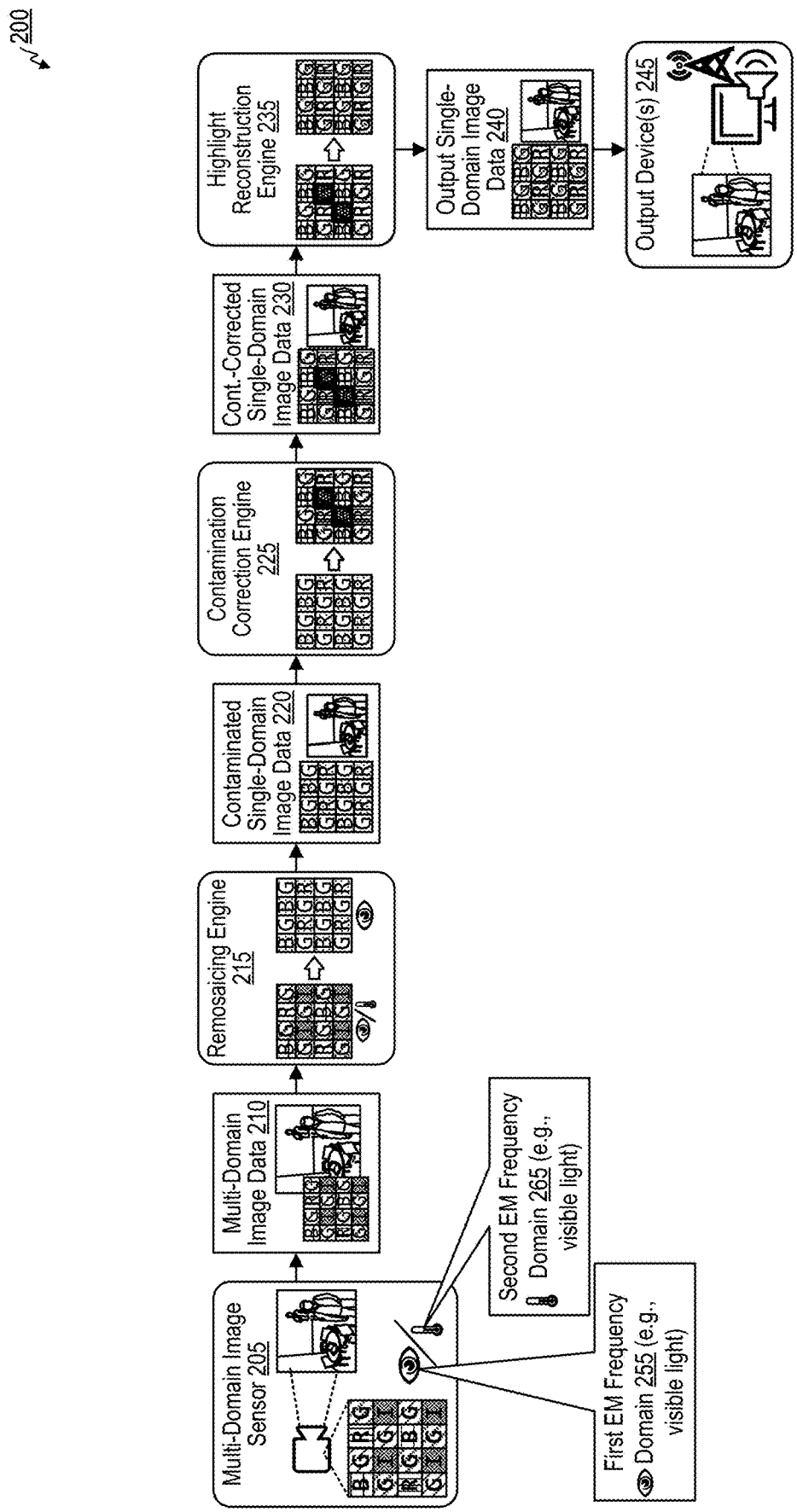
FIG. 2 is a block diagram illustrating an example architecture an imaging system that performs an imaging process using a multi-domain image sensor, in accordance with some examples.

FIG. 2 is a block diagram illustrating an example architecture an imaging system 200 that performs an imaging process using a multi-domain image sensor 205. The imaging system 200 can include at least one of the image capture and processing system 100, the image capture device 105A, the image processing device 105B, the HMD 310, the mobile handset 410, an imaging system that performs the imaging process 1100, the computing system 1200, the processor 1210, or a combination thereof. In some examples, the imaging system 200 can include, for instance, one or more laptops, phones, tablet computers, mobile handsets, video game consoles, vehicle computers, desktop computers, wearable devices, televisions, media centers, extended reality (XR) systems, virtual reality (VR) systems, augmented reality (AR) systems, mixed reality (MR) systems, head-mounted display (HMD) devices, other types of computing devices discussed herein, or combinations thereof.

The imaging system 200 includes a multi-domain image sensor 205 that captures multi-domain image data 210. Examples of the multi-domain image sensor 205 include the image capture and processing system 100, the image capture device 105A, the image processing device 105B, the image sensor 130, image sensor(s) of any of cameras 330A-330D, image sensor(s) of any of cameras 430A-430D, an image sensor that captures the image 905, an image sensor that captures the image 1005, the image sensor of operation 1105, an image sensor of an input device 1245, or a combination thereof. In some examples, the multi-domain image data 210 includes raw image data, image data, pixel data, image frame(s), raw video data, video data, video frame(s), or a combination thereof.

A first portion of the multi-domain image sensor 205 is sensitive to a first electromagnetic (EM) frequency domain 255. A second portion of the multi-domain image sensor 205 is sensitive to a second EM frequency domain 265. In some examples, a third portion of the multi-domain image sensor 205 is sensitive to a third EM frequency domain, and so forth, with different portions of the image sensor sensitive to any number of different EM frequency domains. Different EM frequency domains can include, for example, the radio EM frequency domain, the microwave EM frequency domain, the infrared (IR) EM frequency domain, the visible light (VL) EM frequency domain, the ultraviolet (UV) EM frequency domain, the X-Ray EM frequency domain, the gamma ray EM frequency domain, a subset of any of these, or a combination thereof. A given portion of the multi-domain image sensor 205 can be sensitive to any of these listed EM frequency domains, subsets thereof, and/or combinations thereof. Subsets of EM frequency domains can include, for instance, different colors of visible light (e.g., red, blue, green), frequency bands within a given EM frequency domain, frequency bands spanning across at least portion(s) of two or more EM frequency domains, or combinations thereof. For instance, in some examples, the VL EM frequency domain can include red (R), green (G), blue (B), or a combination thereof. In some examples, the IR EM frequency domain can include near infrared (NIR), mid infrared (MIR), far infrared (FIR), or a combination thereof. In some examples, each photodetector in the multi-domain image sensor 205 that is sensitive to the second EM frequency domain 265 (e.g., IR) can be adjacent to at least one photodetector that is sensitive to the first EM frequency domain 255 (e.g., visible light).

The multi-domain image sensor 205 includes at least one array of photodetectors. In some examples, a photodetector in the array can are covered by at least one filter that can control which EM frequency domain(s) (and/or subsets and/or combinations thereof) reach the photodetector, effectively controlling which EM frequency domain(s) (and/or subsets and/or combinations thereof) the photodetector is sensitive to. In some examples, different photodetectors in the array can be covered by different filters. In some examples, different photodetectors in the array can be sensitive to different EM frequency domain(s) (and/or subsets and/or combinations thereof), for instance based on use of filters, based on the characteristics of the photodetectors themselves, or a combination thereof. For instance, in some examples, the multi-domain image sensor 205 includes a first set of photodetectors that is sensitive to a first EM frequency domain 255 and a second set of photodetectors that is sensitive to a second EM frequency domain 265. In some examples, the multi-domain image sensor 205 additionally includes a third set of photodetectors that is sensitive to a third EM frequency domain, and so forth, with different sets of photodetectors of the image sensor sensitive to any number of different EM frequency domains.

In an illustrative example, the multi-domain image sensor 205 includes a first portion (e.g., a first set of photodetectors) that is sensitive to the visible light EM frequency domain, and a second portion (e.g., a second set of photodetectors) that is sensitive to the IR EM frequency domain. The first portion (e.g., a first set of photodetectors) can be further divided into sub-portions (e.g., subsets of the first set of photodetectors) that are sensitive to different colors (e.g., red, green, and/or blue) of the visible light EM frequency domain. A graphic representing the multi-domain image sensor 205 is illustrated in FIG. 2, and illustrates a camera capturing a photo of a scene with two people in a room near a laptop on a table. An exemplary portion of a photodetector array of the multi-domain image sensor 205 of the camera is illustrated as a grid, with each cell in the grid representing a photodetector that is sensitive to a particular EM frequency domain (or subset thereof) marked on the cell. Cells marked "R" are sensitive to red light from the visible light EM frequency domain. Cells marked "G" are sensitive to green light from the visible light EM frequency domain. Cells marked "B" are sensitive to blue light from the visible light EM frequency domain. Cells marked "I" are sensitive to infrared signals from the infrared EM frequency domain. The graphic also includes an icon of an eye to represent the visible light EM frequency domain, and an icon of a thermometer to represent the infrared light EM frequency domain. Within FIG. 2, a graphic representing the raw sensor data 210 illustrates a representation of an image of the scene that is depicted in the graphic representing the multi-domain image sensor 205, along with the grid representing the photodetector array of the multi-domain image sensor 205, to indicate that the multi-domain image data 210 can include raw image data that is not yet demosaiced. It should be understood that the illustrative example is exemplary rather than limiting. For instance, the multi-domain image sensor 205 can include a different arrangement of photodetectors. The multi-domain image sensor 205 can be sensitive to different sets of EM frequency domains.

In some examples, the multi-domain image sensor 205 can be directed toward a user (e.g., can face toward the user), and can thus capture sensor data (e.g., image data) of (e.g., depicting or otherwise representing) at least portion(s) of the user. In some examples, the multi-domain image sensor 205 can be directed away from the user (e.g., can face away from the user) and/or toward an environment that the user is in, and can thus capture sensor data (e.g., image data) of (e.g., depicting or otherwise representing) at least portion(s) of the environment. In some examples, multi-domain image data 210 captured by the multi-domain image sensor 205 is directed away from the user and/or toward the user. In some examples, multi-domain image data 210 captured by the multi-domain image sensor 205 is can have a field of view (FoV) that includes, is included by, overlaps with, and/or otherwise corresponds to, a FoV of the eyes of the user.

In some examples, imaging system 200 can also include one or more other sensors in addition to the multi-domain image sensor 205, such as one or more other cameras, other image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the one or more sensors 205 include at least one input device 1245 of the computing system 1200. In some implementations, one or more of these additional sensor(s) may complement or refine sensor readings from the multi-domain image sensor 205. For example, Inertial Measurement Units (IMUs), accelerometers, gyroscopes, or other sensors may be used to identify a pose (e.g., position and/or orientation) and/or motion(s) and/or acceleration(s) of the imaging system 200 and/or of the user in the environment, which can be used by the imaging system 200 to reduce motion blur, rotation blur, or combinations thereof.

The imaging system 200 passes the multi-domain image data 210 from the multi-domain image sensor 205 to a remosaicing engine 215. The remosaicing engine 215 can include the image processing device 105B, the image processor 150, the host processor 152, the ISP 154, the computing system 1200, the processor 1210, or a combination thereof. In some examples, remosaicing engine 215 can remosaicing on the multi-domain image data 210. The remosaicing can generate contaminated single-domain image data 220 using only the pixel data corresponding to a subset of the multiple EM frequency domains for which image data is captured in the multi-domain image data 210. For instance, if the multi-domain image data 210 includes pixel data for a first EM frequency domain 255 and pixel data for a second EM frequency domain 265, the remosaicing engine 215 can remosaic the multi-domain image data 210 to generate the contaminated single-domain image data 220 to only include the pixel data for the first EM frequency domain, without including the pixel data for the second EM frequency domain. In an illustrative example, the first EM frequency domain 255 may be the visible light frequency domain, the second EM frequency domain 265 may be the IR frequency domain, and the remosaicing engine 215 can remosaic the multi-domain image data 210 to remove the IR frequency pixel data to leave only the visible light pixel data, for instance in an arrangement of pixels corresponding to different color channels of visible light (e.g., red, green, blue, as in a Bayer arrangement) to produce contaminated single-domain image data 220. In some examples, the remosaicing engine 215 can demosaic and/or perform pixel interpolation before and/or after remosaicing. In some examples, the remosaicing engine 215 can perform other image processing operations (e.g., after remosaicing but before demosaicing), such as adjusting brightness, saturation, noise reduction, sharpness, contrast, luminosity, white balance, black balance, and/or other attributes of the multi-domain image data 210 and/or of the contaminated single-domain image data 220. In some examples, the remosaicing engine 215 can demosaic, perform pixel interpolation, and/or remosaic the multi-domain image data 210 to generate the contaminated single-domain image data 220 based on only a subset of the multi-domain image data 210 corresponding to photodetectors sensitive to a specified EM frequency domain.

In an illustrative example, the remosaicing engine 215 can remosaic the multi-domain image data 210 using only the image data from the photodetectors sensitive to the visible light EM frequency domain, ignoring or skipping image data from the photodetectors sensitive to the IR EM frequency domain. The remosaicing engine 215 can use pixel interpolation to fill in the gaps in the contaminated single-domain image data 220 caused by ignoring or skipping image data from the photodetectors sensitive to the IR EM frequency domain. In another illustrative example, the remosaicing engine 215 can remosaic the multi-domain image data 210 using only the image data from the photodetectors sensitive to the IR EM frequency domain, ignoring or skipping image data from the photodetectors sensitive to the visible EM frequency domain. In some examples, the remosaicing engine 215 can use pixel interpolation to fill in the gaps in the contaminated single-domain image data 220 caused by ignoring or skipping image data from the photodetectors sensitive to the visible light EM frequency domain.

In some examples, the contaminated single-domain image data 220 that is output by the remosaicing engine 215 can simulate raw image data captured by a single-domain image sensor. The photodetector array arrangement associated with a single EM frequency domain can be a photodetector array arrangement that can be used in a single-domain image sensor sensitive to the single EM frequency domain. For instance if the single EM frequency domain is the visible light EM frequency domain, then the remosaicing engine 215 can remosaic the multi-domain image data 210 according to an arrangement of photodetectors sensitive to red, green, and blue, respectively (e.g., a Bayer filter arrangement).

In some situations, when multi-domain image data 210 is processed using the remosaicing engine 215 to only use image data from a first EM frequency domain 255 that the multi-domain image sensor 205 is sensitive to as discussed above, the contaminated single-domain image data 220 generated by the remosaicing engine 215 can include image artifacts. These image artifacts in the contaminated single-domain image data 220 can be caused by contamination from the second EM frequency domain 265 that the multi-domain image sensor 205 is also sensitive to. These visual artifacts can include false colors and/or chromatic aberration(s), and can appear particularly prominently at or around sharp edges in the image. This contamination, and/or these image artifacts, can be referred to as cross-domain contamination.

The imaging system 200 includes a contamination correction engine 225 to perform cross-domain contamination reduction on the contaminated single-domain image data 220 to reduce cross-domain contamination from the contaminated single-domain image data 220 to generate contamination-corrected single-domain image data 230. The contamination correction engine 225 can include the image processing device 105B, the image processor 150, the host processor 152, the ISP 154, the computing system 1200, the processor 1210, or a combination thereof. Cross-domain contamination reduction using the contamination correction engine 225 can generate the contamination-corrected single-domain image data 230 by reducing contamination from the second EM frequency domain 265 in the contaminated single-domain image data 220 when the contaminated single-domain image data 220 includes pixel data corresponding to the first EM frequency domain 255. In some examples, the contamination correction engine 225 performs cross-domain contamination reduction on the contaminated single-domain image data 220 by subtracting cross-domain contamination values from the pixel values of the contaminated single-domain image data 220. The cross-domain contamination values can be based on the pixel values for the second EM frequency domain 265 in the multi-domain image data 210. For instance, the cross-domain contamination values can be a combination (e.g., a product) of the pixel values for the second EM frequency domain 265 in the multi-domain image data 210 and a corresponding coefficient. In an illustrative example, the first EM frequency domain 255 is the visible light EM frequency domain (e.g., which may be further subdivided into colors such as red, green, and blue), the second EM frequency domain 265 is the infrared (IR) EM frequency domain, and the contamination correction engine 225 performs cross-domain contamination reduction on the contaminated single-domain image data 220 to generate the contamination-corrected single-domain image data 230 according to the following equations:

$$R = R_{contaminated} - a \cdot IR \quad \text{Equation 1:}$$

$$G = G_{contaminated} - b \cdot IR \quad \text{Equation 2:}$$

$$B = B_{contaminated} - c \cdot IR \quad \text{Equation 3:}$$

In Equation 1 above, R represents a value of the red color channel in a pixel of the contamination-corrected single-domain image data 230, $R_{contaminated}$ represents a value of the red color channel in a corresponding pixel of the contaminated single-domain image data 220, a represents a first coefficient, and IR represents a value of at least one corresponding infrared pixel in the multi-domain image data 210. The position of the pixel with the red color channel value R in the frame of the contamination-corrected single-domain image data 230 can match the position of the pixel with the red color channel value $R_{contaminated}$ in the frame of the contaminated single-domain image data 220. The position of the infrared pixel with the value IR in the frame of the multi-domain image data 210 can match, be adjacent to, or be within a threshold distance of the positions of the pixel with the red color channel values R and $R_{contaminated}$ in the respective frames of the contamination-corrected single-domain image data 230 and the contaminated single-domain image data 220. In some examples, the value IR is a combination (e.g., an average or a weighted average weighed by distance) of multiple infrared pixels whose positions in the in the frame of the multi-domain image data 210 are adjacent to or within the threshold distance of the positions of the pixel with the red color channel values R and $R_{contaminated}$ in the respective frames of the contamination-corrected single-domain image data 230 and the contaminated single-domain image data 220.

Similarly, in Equation 2 above, G represents a value of the green color channel in a pixel of the contamination-corrected single-domain image data 230, $G_{contaminated}$ represents a value of the green color channel in a corresponding pixel of the contaminated single-domain image data 220, b represents a second coefficient, and IR represents a value of at least one corresponding infrared pixel in the multi-domain image data 210. The position of the pixel with the green color channel value G in the frame of the contamination-corrected single-domain image data 230 can match the position of the pixel with the green color channel value $G_{contaminated}$ in the frame of the contaminated single-domain image data 220. The position(s) of the infrared pixel(s) with the value IR in the frame of the multi-domain image data 210 can match, be adjacent to, or be within a threshold distance of the positions of the pixel with the green color channel values G and $G_{contaminated}$ in the respective frames of the contamination-corrected single-domain image data 230 and the contaminated single-domain image data 220. In some examples, the value IR is a combination (e.g., an average or a weighted average weighed by distance) of multiple infrared pixels whose positions in the in the frame of the multi-domain image data 210 are adjacent to or within the threshold distance of the positions of the pixel with the green color channel values G and $G_{contaminated}$ in the respective frames of the contamination-corrected single-domain image data 230 and the contaminated single-domain image data 220.

In Equation 3 above, B represents a value of the blue color channel in a pixel of the contamination-corrected single-domain image data 230, $B_{contaminated}$ represents a value of the blue color channel in a corresponding pixel of the contaminated single-domain image data 220, c represents a third coefficient, and IR represents a value of at least one corresponding infrared pixel in the multi-domain image data 210. The position of the pixel with the blue color channel value B in the frame of the contamination-corrected single-domain image data 230 can match the position of the pixel with the blue color channel value $B_{contaminated}$ in the frame of the contaminated single-domain image data 220. The position(s) of the infrared pixel(s) with the value IR in the frame of the multi-domain image data 210 can match, be adjacent to, or be within a threshold distance of the positions of the pixel with the blue color channel values B and $B_{contaminated}$ in the respective frames of the contamination-corrected single-domain image data 230 and the contaminated single-domain image data 220. In some examples, the value IR is a combination (e.g., an average or a weighted average weighed by distance) of multiple infrared pixels whose positions in the in the frame of the multi-domain image data 210 are adjacent to or within the threshold distance of the positions of the pixel with the blue color channel values B and $B_{contaminated}$ in the respective frames of the contamination-corrected single-domain image data 230 and the contaminated single-domain image data 220.

In some examples, the values of the three coefficients a, b, and c are distinct from one another. In some examples, the values of at least two of the three coefficients (a, b, and c) match.

A graphic representing the remosaicing engine 215 is illustrated in FIG. 2, and illustrates a conversion by the remosaicing engine 215 from the pixel mosaic from the multi-domain image data 210 (which includes red (R), green (G), blue (B), and infrared (I) pixels) into a pixel mosaic of the contaminated single-domain image data 220 (which includes red (R), green (G), and blue (B) pixels, without infrared (I) pixels). In the pixel mosaic of the contaminated single-domain image data 220, the pixels representing the first EM frequency domain 255 (e.g., red (R), green (G), and blue (B)) are illustrated as faded to represent contamination from the second EM frequency domain 265 (e.g., infrared).

In some examples, the contamination-corrected single-domain image data 230 generated using the contamination correction engine 225 includes visual artifacts caused by the contamination correction engine 225 applying contamination corrections to pixel values that were overexposed and/or oversaturated in one or more color channels in the multi-domain image data 210 and the contaminated single-domain image data 220. The dynamic range of the multi-domain image sensor 205 can place an upper bound and/or a lower bound on how bright or dim of a shade can be captured by each color channel of the multi-domain image sensor 205. For example, in the graphs 600 of FIG. 6, the lower bound is marked as 0, and the upper bound is marked as 1. In the graph 800 and the graph 850 of FIGS. 8A-8B, the lower bound is marked as 0, and the upper bound is marked as maximum saturation 815 and maximum saturation 820. In some examples, portions of a scene that are very bright may be overexposed and/or oversaturated in at least a first color channel in the multi-domain image data 210 and the contaminated single-domain image data 220, meaning that the portions of the scene have a maximum pixel value for at least the first color channel. Detail can be lost in these portions of the scene, as these portions may appear uniformly bright or dim in at least the first color channel, obscuring any detail that these portions may have. For instance, these portions of the scene may still have sub-portions that are brighter than other sub-portions, or textures, that are not visible in the multi-domain image data 210 and the contaminated single-domain image data 220 because these portions are overexposed or oversaturated in at least the first color channel.

When the contamination correction engine 225 applies the contamination correction to the contaminated single-domain image data 220 to generate the contamination-corrected single-domain image data 230, the contamination correction engine 225 subtracts the cross-domain contamination values (e.g., a IR, b IR, or c IR) from the pixel values of the contaminated single-domain image data 220 as discussed above. If a portion of the contaminated single-domain image data 220 is overexposed and/or oversaturated in at least a first color channel as discussed above, the contamination-corrected single-domain image data 230 can include a visual artifact, for instance appearing to include a blob, splotch, or area that appears more uniform than the surrounding areas. In some examples, the area may be a particular color (e.g., a uniform color). Examples of the visual artifact include the visual artifact 930, the visual artifact 935, the visual artifact 1030, and the visual artifact 1035. This is caused by the portion of the contaminated single-domain image data 220 that is overexposed and/or oversaturated in at least the first color channel being treated uniformly by the contamination correction engine 225, obscuring any further detail that may be present in the overexposed and/or oversaturated portion.

A graphic representing the contamination correction engine 225 is illustrated in FIG. 2, and illustrates a conversion by the contamination correction engine 225 from the pixel mosaic from the contaminated single-domain image data 220 (which includes red (R), green (G), and blue (B) pixels, contaminated by infrared (I)) into a pixel mosaic of the contamination-corrected single-domain image data 230 (which includes red (R), green (G), and blue (B) pixels, with IR-based contamination reduced or eliminated). In the pixel mosaic of the contamination-corrected single-domain image data 230, two of the green pixels are illustrated as shaded in which a dark pattern, and outlined in thick black lines, to indicate that these two green pixels have incorrect values due to overexposure and/or oversaturation of the corresponding two green pixels in the multi-domain image data 210 and/or the contaminated single-domain image data 220.

The imaging system 200 includes a highlight reconstruction engine 235 to perform highlight reconstruction on the contamination-corrected single-domain image data 230 to generate output single-domain image data 240. The highlight reconstruction engine 235 can include the image processing device 105B, the image processor 150, the host processor 152, the ISP 154, the computing system 1200, the processor 1210, or a combination thereof. The output single-domain image data 240 can be referred to as reconstructed single-domain image data, or as reconstructed image data.

For areas of the multi-domain image data 210 and/or the contaminated single-domain image data 220 in which only a first color channel is overexposed and/or oversaturated, the highlight reconstruction engine 235 can perform highlight reconstruction based on corresponding pixel data from the second color channel in the contamination-corrected single-domain image data 230, corresponding pixel data from the third color channel in the contamination-corrected single-domain image data 230, and corresponding pixel data from the IR domain in the multi-domain image data 210. In an illustrative example, depending on which color channel is overexposed and/or oversaturated in the multi-domain image data 210 and/or the contaminated single-domain image data 220, the highlight reconstruction engine 235 can perform highlight reconstruction on the contamination-corrected single-domain image data 230 to generate output single-domain image data 240 according to the following equations:

$$R_{reconstructed} = \text{recovery}_1(G,B,IR) \quad \text{Equation 4:}$$

$$G_{reconstructed} = \text{recovery}_1(R,B,IR) \quad \text{Equation 5:}$$

$$B_{reconstructed} = \text{recovery}_1(R,G,IR) \quad \text{Equation 6:}$$

In Equations 4-6 above, $R_{reconstructed}$, $G_{reconstructed}$, and $B_{reconstructed}$ represent reconstructed pixel values generated using the highlight reconstruction engine 235 for red, green, and blue pixels, respectively. For instance, if the red color channel is overexposed and/or oversaturated in the multi-domain image data 210 and/or the contaminated single-domain image data 220, the highlight reconstruction engine 235 generates $R_{reconstructed}$ as in Equation 4. If the green color channel is overexposed and/or oversaturated in the multi-domain image data 210 and/or the contaminated single-domain image data 220, the highlight reconstruction engine 235 generates $G_{reconstructed}$ as in Equation 5. If the blue color channel is overexposed and/or oversaturated in the multi-domain image data 210 and/or the contaminated single-domain image data 220, the highlight reconstruction engine 235 generates $B_{reconstructed}$ as in Equation 6. In Equations 4-6 above, R, G, and B represent corresponding pixel values in the contamination-corrected single-domain image data 230. In Equations 4-6 above, IR represents corresponding pixel value(s) in the multi-domain image data 210. The function recovery$_1$( ) can represent an average, a weighted average, a linear function, a non-linear function, or a combination thereof. The phrase corresponding pixel value(s), as used herein, may refer to pixel(s) in the same position relative to the respective frame, adjacent pixel position(s) relative to the respective frame, and/or pixel position(s) within a threshold distance relative to the respective frame.

Figure 7:
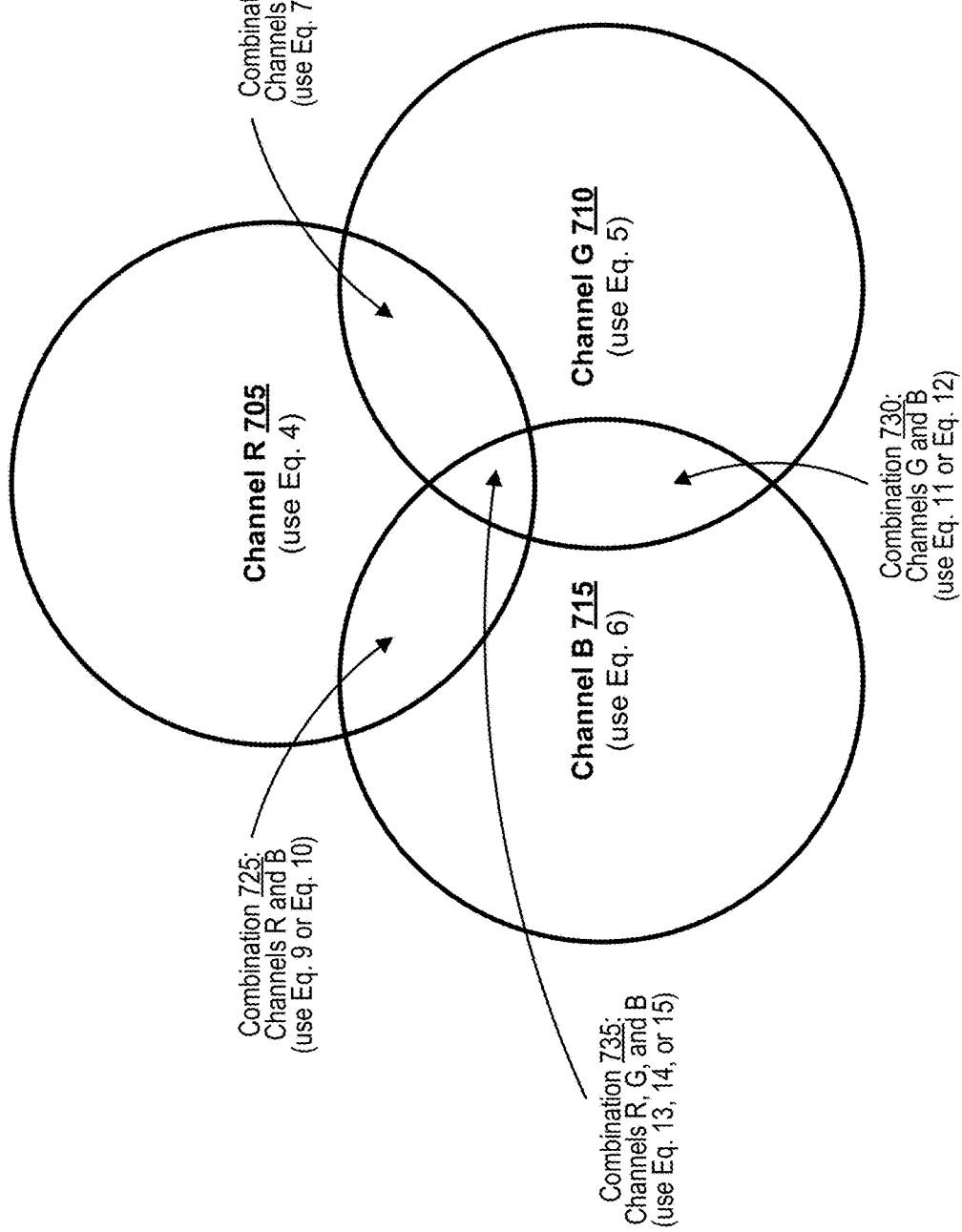
FIG. 7 is a Venn diagram illustrating different combinations of color channels that can be overexposed and/or oversaturated in an image, and corresponding highlight reconstruction equations, in accordance with some examples.

For areas of the multi-domain image data 210 and/or the contaminated single-domain image data 220 in which both a first color channel and a second color channel are overexposed and/or oversaturated, the highlight reconstruction engine 235 can perform highlight reconstruction based on corresponding pixel data from the third color channel in the contamination-corrected single-domain image data 230, the color channel being reconstructed in the contamination-corrected single-domain image data 230, and corresponding pixel data from the IR domain in the multi-domain image data 210. Different combinations of color channels that can be overexposed and/or oversaturated are illustrated in FIG. 7. In an illustrative example, depending on which combination of color channels is overexposed and/or oversaturated in the multi-domain image data 210 and/or the contaminated single-domain image data 220, the highlight reconstruction engine 235 can perform highlight reconstruction on the contamination-corrected single-domain image data 230 to generate output single-domain image data 240 according to the following equations:

$$\text{If } R \text{ and } G \text{ are overexposed: } R_{reconstructed} = \text{recovery}_2(B,R,IR) \quad \text{Equation 7:}$$

If R and G are overexposed: $G_{reconstructed} = recovery_2(B,G,IR)$     Equation 8:

If R and B are overexposed: $R_{reconstructed} = recovery_2(G,R,IR)$     Equation 9:

If R and B are overexposed: $B_{reconstructed} = recovery_2(G,B,IR)$     Equation 10:

If G and B are overexposed: $G_{reconstructed} = recovery_2(R,G,IR)$     Equation 11:

If G and B are overexposed: $B_{reconstructed} = recovery_2(R,B,IR)$     Equation 12:

In Equations 7-12 above, $R_{reconstructed}$, $G_{reconstructed}$, and $B_{reconstructed}$ represent reconstructed pixel values generated using the highlight reconstruction engine 235 for red, green, and blue pixels, respectively. R, G, and B represent corresponding pixel values in the contamination-corrected single-domain image data 230. IR represents corresponding pixel value(s) in the multi-domain image data 210. The function $recovery_2(\ )$ can represent an average, a weighted average, a linear function, a non-linear function, or a combination thereof. The phrase corresponding pixel value(s), as used herein, may refer to pixel(s) in the same position relative to the respective frame, adjacent pixel position(s) relative to the respective frame, and/or pixel position(s) within a threshold distance relative to the respective frame. In some examples, the functions $recovery_1(\ )$ and $recovery_2(\ )$ are equivalent to one another. In some examples, the functions $recovery_1(\ )$ and $recovery_2(\ )$ are distinct from one another.

For areas of the multi-domain image data 210 and/or the contamination-corrected single-domain image data 220 in which all three color channels are overexposed and/or oversaturated, the highlight reconstruction engine 235 can perform highlight reconstruction based on the a combination (e.g., an average or a weighted average) of pixel values from the area in the contamination-corrected single-domain image data 230 and corresponding pixel values from the area in the contamination-corrected single-domain image data 220. An example of this type of highlight reconstruction is illustrated in the color saturation reconstruction 855 of the graph 850 of FIG. 8B. The positions of the pixel values from the area in the frame of the contamination-corrected single-domain image data 230 match the positions of the corresponding pixel values from the area in the frame of the contaminated single-domain image data 220. In an illustrative example, the highlight reconstruction engine 235 can perform highlight reconstruction on the contamination-corrected single-domain image data 230 to generate output single-domain image data 240 according to the following equations:

$R_{reconstructed} = recovery_3(R, R_{contaminated})$     Equation 13:

$G_{reconstructed} = recovery_3(G, G_{contaminated})$     Equation 14:

$B_{reconstructed} = recovery_3(B, B_{contaminated})$     Equation 15:

In Equations 13-15 above, $R_{reconstructed}$, $G_{reconstructed}$, and $B_{reconstructed}$ represent reconstructed pixel values generated using the highlight reconstruction engine 235 for red, green, and blue pixels, respectively. R, G, and B represent corresponding pixel values in the contamination-corrected single-domain image data 230. $R_{reconstructed}$, $G_{reconstructed}$, and $B_{reconstructed}$ represent corresponding pixel values in the contaminated single-domain image data 220. The function $recovery_3(\ )$ can represent an average, a weighted average, a linear function, a non-linear function, or a combination thereof. The phrase corresponding pixel value(s), as used herein, may refer to pixel(s) in the same position relative to the respective frame, adjacent pixel position(s) relative to the respective frame, and/or pixel position(s) within a threshold distance relative to the respective frame. In some examples, at least two of the functions $recovery_1(\ )$, $recovery_2(\ )$, and $recovery_3(\ )$ are equivalent to one another. In some examples, at least two of the functions $recovery_1(\ )$, $recovery_2(\ )$, and $recovery_3(\ )$ are distinct from one another.

A graphic representing the highlight reconstruction engine 235 is illustrated in FIG. 2, and illustrates a conversion by the highlight reconstruction engine 235 from the pixel mosaic from the contamination-corrected single-domain image data 230 (which includes visual artifacts on two green pixels due to overexposure and/or oversaturation of the corresponding two green pixels in the multi-domain image data 210 and/or the contaminated single-domain image data 220) into a pixel mosaic of the output single-domain image data 240 (in which the visual artifacts are reduced or eliminated).

The imaging system 200 includes output device(s) 245. The output device(s) 245 can include one or more visual output devices, such as display(s) or connector(s) therefor. The output device(s) 245 can include one or more audio output devices, such as speaker(s), headphone(s), and/or connector(s) therefor. The output device(s) 245 can include one or more of the output device 1235 and/or of the communication interface 1240 of the computing system 1200. In some examples, the imaging system 200 causes the display(s) of the output device(s) 245 to display the output single-domain image data 240. In some examples, the imaging system 200 causes the display(s) of the output device(s) 245 to display the output single-domain image data 240 in the first EM frequency domain 255.

In some examples, the output device(s) 245 include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1235 and/or of the communication interface 1240 of the computing system 1200. In some examples, the imaging system 200 causes the transceiver(s) to send, to a recipient device, the output single-domain image data 240. In some examples, the recipient device can include another imaging system 200, an HMD 310, a mobile handset 410, a computing system 1200, or a combination thereof. In some examples, the recipient device can include a display, and the data sent to the recipient device from the transceiver(s) of the output device(s) 245 can cause the display of the recipient device to display the output single-domain image data 240.

In some examples, the display(s) of the output device(s) 245 of the imaging system 200 function as optical "see-through" display(s) that allow light from the real-world environment (scene) around the imaging system 200 to traverse (e.g., pass) through the display(s) of the output device(s) 245 to reach one or both eyes of the user. For example, the display(s) of the output device(s) 245 can be at least partially transparent, translucent, light-permissive, light-transmissive, or a combination thereof. In an illustrative example, the display(s) of the output device(s) 245 includes a transparent, translucent, and/or light-transmissive lens and a projector. The display(s) of the output device(s) 245 of can include a projector that projects virtual content (e.g., the output single-domain image data 240) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the output single-domain image data 240) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 245 of the imaging system 200 are digital "pass-through" display that allow the user of the imaging system 200 and/or a recipient device to see a view of an environment by displaying the view of the environment on the display(s) of the output device(s) 245. The view of the environment that is displayed on the digital pass-through display can be a view of the real-world environment around the imaging system 200, for example based on sensor data (e.g., images, videos, depth images, point clouds, other depth data, or combinations thereof) captured by the multi-domain image sensor 205 (e.g., multi-domain image data 210 and/or output single-domain image data 240) and/or other sensors described herein. The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., the output single-domain image data 240) overlaid over other otherwise incorporated into the view of the environment. Within FIG. 2, a graphic representing the output device(s) 245 illustrates a display, a speaker, and a wireless transceiver, outputting the output single-domain image data 240.

Figure 3A:
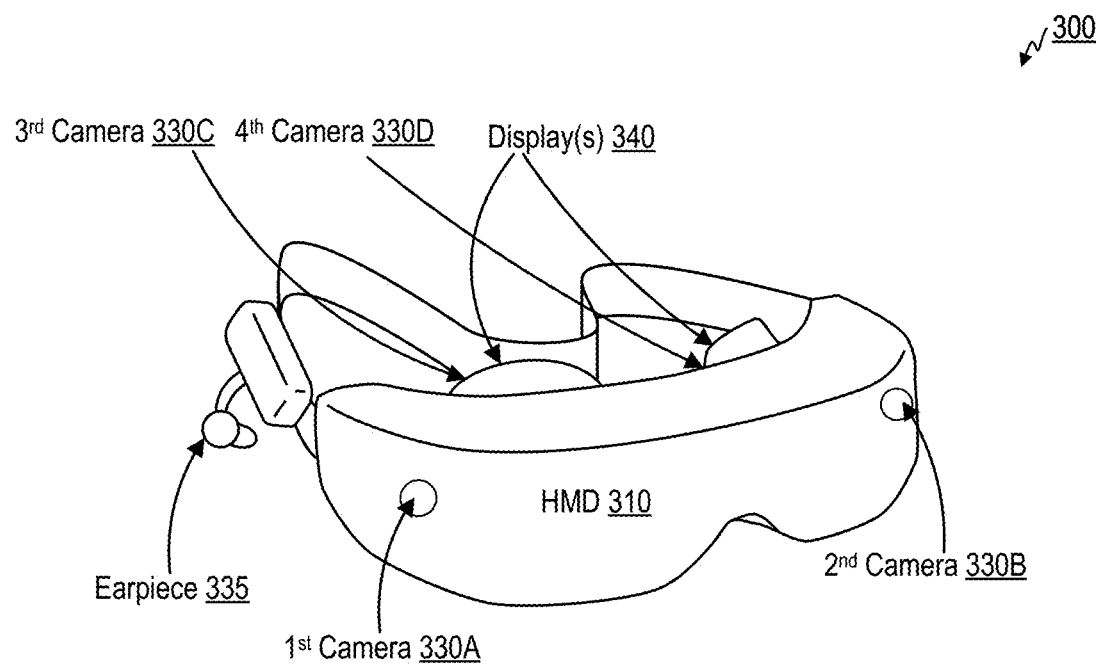
FIG. 3A is a perspective diagram illustrating a head-mounted display (HMD) that is used as part of an imaging system, in accordance with some examples.
Figure 3B:
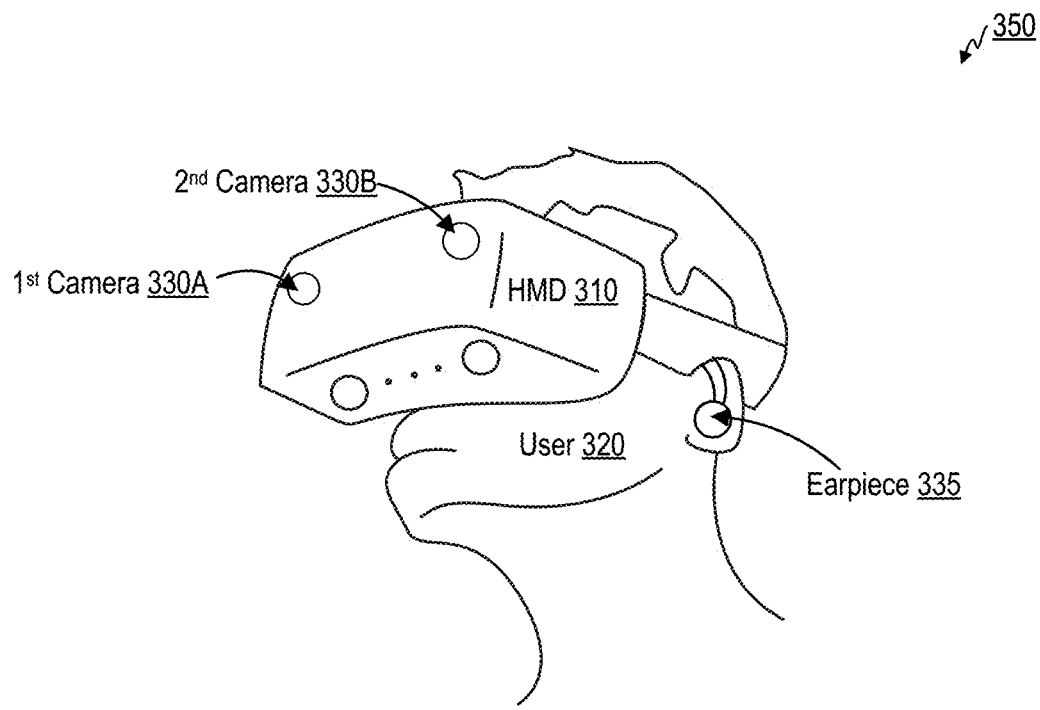
FIG. 3B is a perspective diagram illustrating the head-mounted display (HMD) of FIG. 3A being worn by a user, in accordance with some examples.
Figure 4A:
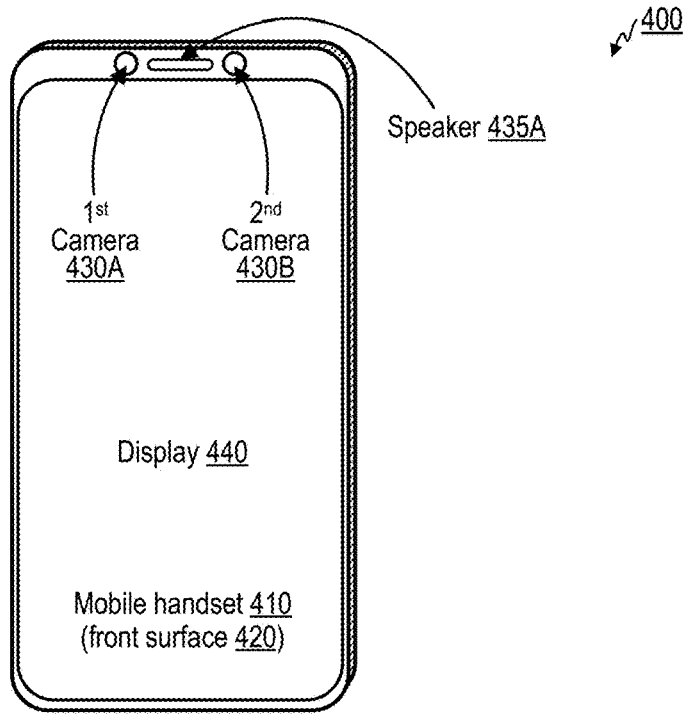
FIG. 4A is a perspective diagram illustrating a front surface of a mobile handset that includes front-facing cameras and that can be used as part of an imaging system, in accordance with some examples.
Figure 4B:
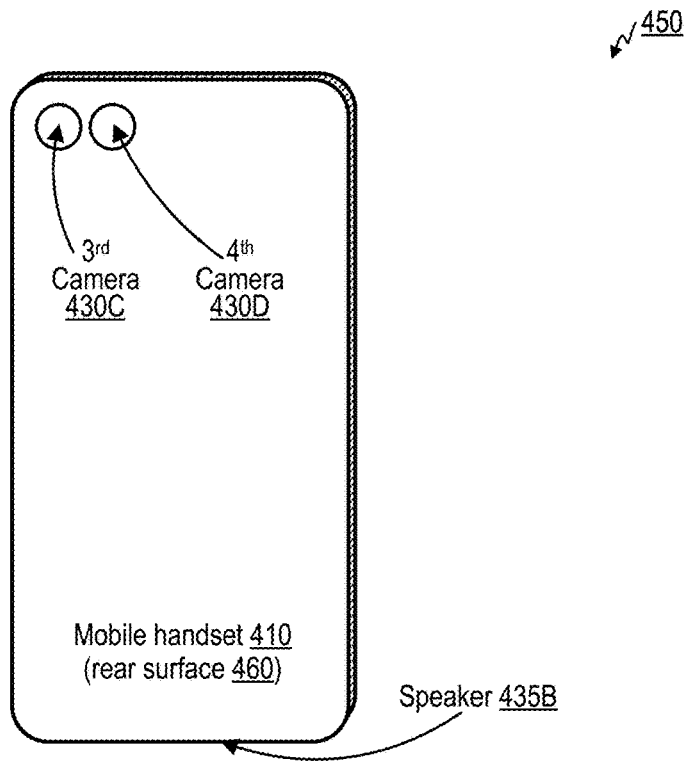
FIG. 4B is a perspective diagram illustrating a rear surface of a mobile handset that includes rear-facing cameras and that can be used as part of an imaging system, in accordance with some examples.

In some examples, the imaging system 200 is part of a head-mounted display 310 as discussed with respect to FIGS. 3A-3B, or part of a mobile handset 410 as discussed with respect to FIG. 4A-4B. In some examples, the imaging system 200 is coupled to one or more vehicle sub-systems of a vehicle, such as an automobile, a truck, a train, an aircraft, a watercraft, or a submarine. In some examples, the imaging system 200 can detect, recognize, and/or track an object in image data (e.g., the multi-domain image data 210, the contaminated single-domain image data 220, the contamination-corrected single-domain image data 230, the output single-domain image data 240, or a combination thereof). In a first illustrative example, the imaging system 200 transmits a vehicle control signal to a vehicle control device of the vehicle, causing the vehicle control device to route the vehicle based on detection of the at least one object. For instance, if the object is a pedestrian, another vehicle, a tree, a structure, or another obstacle, the vehicle control signal can cause the vehicle control device to route the vehicle away from or around the object, to avoid the object. On the other hand, if the object is a lane, a street, lane marking of a lane, an exit, a turn, a speed bump, or another indicator of a thoroughfare, the vehicle control signal can cause the vehicle control device to route the vehicle toward, along, or within the object. In a second illustrative example, the imaging system 200 transmits an alert signal to a vehicle output device (e.g., an example of the output device(s) 245) of the vehicle, causing the vehicle output device to output an alert that is indicative of detection of the at least one object. For instance, if the object is a pedestrian, another vehicle, a tree, a structure, or another obstacle, the vehicle alert signal can cause the vehicle output device to alert the driver, operator, and/or passenger(s) of the vehicle to the detected presence of the object, for instance so that the driver and/or operator can route the vehicle around or away from the object to avoid the object. On the other hand, if the object is a lane, a street, lane marking of a lane, an exit, a turn, a speed bump, or another indicator of a thoroughfare, the vehicle alert signal can cause the vehicle output device to alert the driver, operator, and/or passenger(s) of the vehicle to the detected presence of the object, for instance so that the driver and/or operator can route the toward, along, or within the object.

It should be understood that references herein to the multi-domain image sensor 205, and other sensors described herein, as images sensors should be understood to also include other types of sensors that can produce outputs in image form, such as depth sensors that produce depth images and/or point clouds that can be expressed in image form and/or rendered images of 3D models (e.g., RADAR, LIDAR, SONAR, SODAR, ToF, structured light). It should be understood that references herein to image data, and/or to images, produced by such sensors can include any sensor data that can be output in image form, such as depth images, point clouds that can be expressed in image form, and/or rendered images of 3D models.

In some examples, certain elements of the imaging system 200 (e.g., the multi-domain image sensor 205, the remosaicing engine 215, the contamination correction engine 225, the highlight reconstruction engine 235, the output device(s) 245, or a combination thereof) include a software element, such as a set of instructions corresponding to a program, that is run on a processor such as the processor 1210 of the computing system 1200, the image processor 150, the host processor 152, the ISP 154, or a combination thereof. In some examples, one or more of these elements of the imaging system 200 can include one or more hardware elements, such as a specialized processor (e.g., the processor 1210 of the computing system 1200, the image processor 150, the host processor 152, the ISP 154, or a combination thereof). In some examples, one or more of these elements of the imaging system 200 can include a combination of one or more software elements and one or more hardware elements.

FIG. 3A is a perspective diagram 300 illustrating a head-mounted display (HMD) 310 that is used as part of an imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of an imaging system 200. The HMD 310 includes a first camera 330A and a second camera 330B along a front portion of the HMD 310. The first camera 330A and the second camera 330B may be examples of the multi-domain image sensor 205 of the imaging system 200. The HMD 310 includes a third camera 330C and a fourth camera 330D facing the eye(s) of the user as the eye(s) of the user face the display(s) 340. The third camera 330C and the fourth camera 330D may be examples of the multi-domain image sensor 205 of the imaging system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of multi-domain image sensor 205 of the imaging system 200. In some examples, the first camera 330A, the second camera 330B, third camera 330C, and/or the fourth camera 330D may be, or may include, examples of the image capture and processing system 100, the image capture device 105A, the image processing device 105B, the multi-domain image sensor 205, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 245 of the imaging system 200. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

The HMD 310 may include one or more earpieces 335, which may function as speakers and/or headphones that output audio to one or more ears of a user of the HMD 310, and may be examples of output device(s) 245. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the output single-domain image data 240. The output images can be based on the images captured by the first camera 330A and the second camera 330B (e.g., the multi-domain image data 210, the contaminated single-domain image data 220, the contamination-corrected single-domain image data 230, and/or the output single-domain image data 240), for example with the virtual content (e.g., output single-domain image data 240) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

FIG. 4A is a perspective diagram 400 illustrating a front surface of a mobile handset 410 that includes front-facing cameras and can be used as part of an imaging system 200. The mobile handset 410 may be an example of an imaging system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the multi-domain image sensor 205 of the imaging system 200. The first camera 430A and the second camera 430B can face the user, including the eye(s) of the user, while content (e.g., the multi-domain image data 210, the contaminated single-domain image data 220, the contamination-corrected single-domain image data 230, and/or the output single-domain image data 240) is displayed on the display 440. The display 440 may be an example of the display(s) of the output device(s) 245 of the imaging system 200.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the output single-domain image data 240. The output images can be based on the images (e.g., the multi-domain image data 210, the contaminated single-domain image data 220, the contamination-corrected single-domain image data 230, and/or the output single-domain image data 240) captured by the first camera 430A, the second camera 430B, the third camera 430C, and/or the fourth camera 430D, for example with the virtual content (e.g., output single-domain image data 240) overlaid.

In some examples, the front surface 420 of the mobile handset 410 may include one or more additional cameras in addition to the first camera 430A and the second camera 430B. The one or more additional cameras may also be examples of the multi-domain image sensor 205 of the imaging system 200. In some examples, the front surface 420 of the mobile handset 410 may include one or more additional sensors in addition to the first camera 430A and the second camera 430B. The one or more additional sensors may also be examples of the multi-domain image sensor 205 of the imaging system 200. In some cases, the front surface 420 of the mobile handset 410 includes more than one display 440. The one or more displays 440 of the front surface 420 of the mobile handset 410 can be examples of the display(s) of the output device(s) 245 of the imaging system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the front surface 420 of the mobile handset 410, with these microphones being examples of the multi-domain image sensor 205 of the imaging system 200. In some examples, the audio output by the mobile handset 410 to the user through the one or more speakers 435A and/or other audio output devices may include, or be based on, audio recorded using the one or more microphones.

FIG. 4B is a perspective diagram 450 illustrating a rear surface 460 of a mobile handset that includes rear-facing cameras and that can be used as part of an imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the multi-domain image sensor 205 of the imaging system 200. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the multi-domain image sensor 205 of the imaging system 200. In some examples, the rear surface 460 of the mobile handset 410 may include one or more additional sensors in addition to the third camera 430C and the fourth camera 430D. The one or more additional sensors may also be examples of the multi-domain image sensor 205 of the imaging system 200. In some examples, the first camera 430A, the second camera 430B, third camera 430C, and/or the fourth camera 430D may be, or may include, examples of the image capture and processing system 100, the image capture device 105A, the image processing device 105B, the multi-domain image sensor 205, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the rear surface 460 of the mobile handset 410, with these microphones being examples of the multi-domain image sensor 205 of the imaging system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the output single-domain image data 240. The output images can be based on the images (e.g. the multi-domain image data 210, the contaminated single-domain image data 220, the contamination-corrected single-domain image data 230, and/or the output single-domain image data 240) captured by the third camera 430C and/or the fourth camera 430D, for example with the virtual content (e.g., output single-domain image data 240) overlaid. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
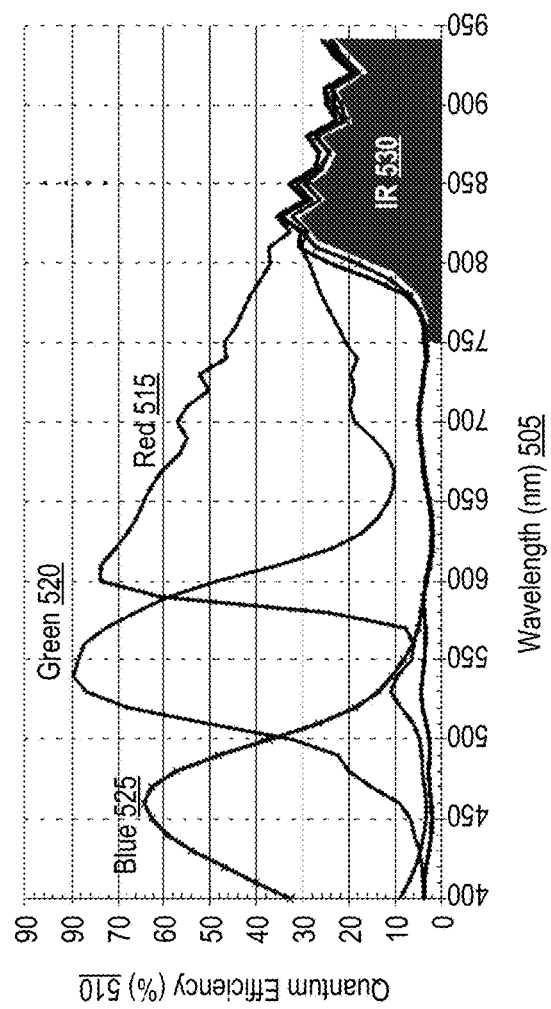
FIG. 5 is a conceptual diagram illustrating a graph of a multi-domain quantum efficiency curve, in accordance with some examples.

FIG. 5 is a conceptual diagram illustrating a graph 500 of a multi-domain quantum efficiency curve. The graph 500 plots curves representing different types of photodetectors along axes representing wavelength 505 (in nanometers (nm)) and quantum efficiency 510 (in percentages). Quantum efficiency 510 can be a representation of a photodetector's electrical sensitivity to light. The curves represent photodetectors that are sensitive to the red color channel 515, the green color channel 520, the blue color channel 525, and the infrared EM frequency domain 530, respectively. The curves representing photodetectors that are sensitive to the red color channel 515, the green color channel 520, and the blue color channel 525 each indicate at least some electrical sensitivity to at least a portion of the infrared EM frequency domain 530, in addition to electrical sensitivity to the respective color channels. This sensitivity can cause the cross-domain contamination in the contaminated single-domain image data 220, that is reduced or removed using the contamination correction engine 225 to generate the contamination-corrected single-domain image data 230.

Figure 6:
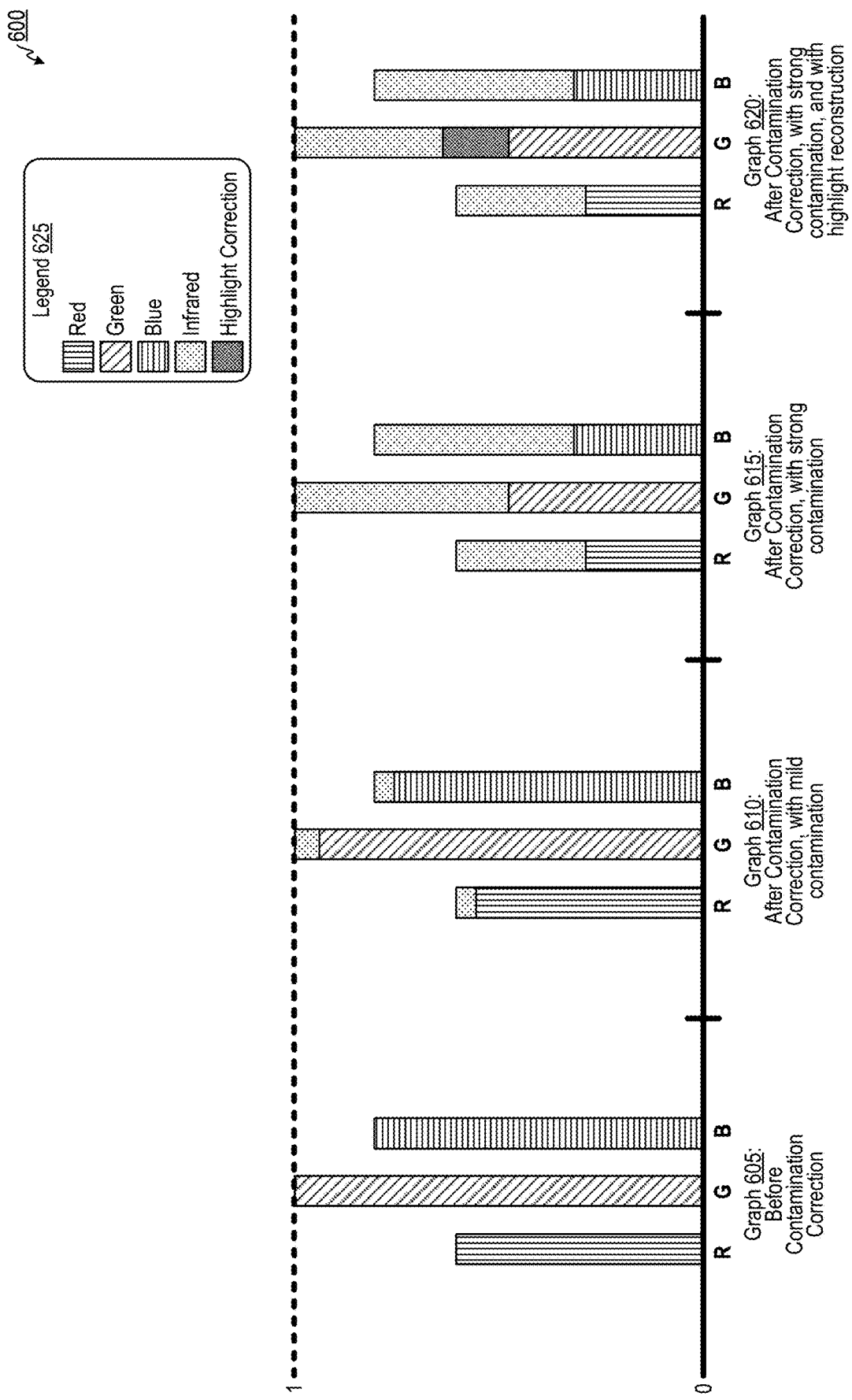
FIG. 6 is a conceptual diagram illustrating graphs of color channel data before contamination correction, after contamination correction, and after highlight reconstruction, in accordance with some examples.

FIG. 6 is a conceptual diagram illustrating graphs 600 of color channel data before contamination correction, after contamination correction, and after highlight reconstruction. The graphs 600 are bar graphs with bars representing values between a lower bound for color exposure and/or saturation (indicated as 0) and an upper bound for color exposure and/or saturation (indicated as 1). In some examples, the upper bound may be identified instead as 100, or 255, or another value. A legend 625 indicates different patterns in the graphs 660 that represent the red color channel, the green color channel, the blue color channel, the infrared EM frequency domain, and a highlight correction.

A first graph 605 indicates color channel values in exemplary contaminated single-domain image data 220 before contamination correction (e.g., to be performed using the contamination correction engine 225). While the values for the red and blue color channels are between the lower bound and the upper bound, the value for the green color channel is overexposed and/or oversaturated, and therefore is set to the upper bound. Because the green color channel is overexposed and/or oversaturated, any detail beyond the upper bound in the green color channel is lost.

A second graph 610 indicates color channel values in exemplary contamination-corrected single-domain image data 230 after contamination correction (e.g., having been performed using the contamination correction engine 225) but before highlight reconstruction (e.g., to be performed using the highlight reconstruction engine 235), where the cross-domain contamination is mild. Small cross-domain contamination values (based on infrared values) are subtracted from the values for the red color channel, the green color channel, and the blue color channel. Because the values for the red and blue color channels were not overexposed and/or oversaturated before contamination correction (e.g., in the graph 605), the mild contamination correction appears natural in the resulting contamination-corrected single-domain image data 230. Because the value for the green color channel was overexposed and/or oversaturated before contamination correction (e.g., in the graph 605), the mild contamination correction can produce a mild visual artifact in the resulting contamination-corrected single-domain image data 230, since the graph 605 lacks information indicating how overexposed and/or oversaturated the green color channel was (e.g., how much above the upper bound the "true" value for the green color channel should have been in the graph 605).

A third graph 615 indicates color channel values in exemplary contamination-corrected single-domain image data 230 after contamination correction (e.g., having been performed using the contamination correction engine 225) but before highlight reconstruction (e.g., to be performed using the highlight reconstruction engine 235), where the cross-domain contamination is strong. Large cross-domain contamination values (based on infrared values) are subtracted from the values for the red color channel, the green color channel, and the blue color channel. Because the values for the red and blue color channels were not overexposed and/or oversaturated before contamination correction (e.g., in the graph 605), even the strong contamination correction appears natural in the resulting contamination-corrected single-domain image data 230. Because the value for the green color channel was overexposed and/or oversaturated before contamination correction (e.g., in the graph 605), the strong contamination correction can produce a strong visual artifact in the resulting contamination-corrected single-domain image data 230, since the graph 605 lacks information indicating how overexposed and/or oversaturated the green color channel was (e.g., how much above the upper bound the "true" value for the green color channel should have been in the graph 605).

A fourth graph 620 indicates color channel values in exemplary output single-domain image data 240 after contamination correction (e.g., having been performed using the contamination correction engine 225) and after highlight reconstruction (e.g., having been performed using the highlight reconstruction engine 235), where the cross-domain contamination is strong as in the third graph 615. The highlight reconstruction engine 235 can perform highlight reconstruction to reduce, remove, and/or correct the visual artifact(s) in the green color channel caused by the overexposure and/or oversaturation in the green color channel before contamination correction (e.g., in the graph 605). In an illustrative example, the highlight reconstruction engine 235 can generate the reconstructed value for the green color channel using Equation 5.

FIG. 7 is a Venn diagram 700 illustrating different combinations of color channels that can be overexposed and/or oversaturated in an image, and corresponding highlight reconstruction equations. The Venn diagram 700 includes three circles. A first circle represents the red color channel 705. If only the red color channel 705 is overexposed and/or oversaturated, the highlight reconstruction engine 235 uses Equation 4. A second circle represents the green color channel 710. If only the green color channel 710 is overexposed and/or oversaturated (e.g., as in first graph 605), the highlight reconstruction engine 235 uses Equation 5. A third circle represents the blue color channel 715. If only the blue color channel 715 is overexposed and/or oversaturated, the highlight reconstruction engine 235 uses Equation 6.

Four combinations of color channels that can be overexposed and/or oversaturated are also illustrated in the Venn diagram 700. In combination 720, if the red color channel 705 and the green color channel 710 are overexposed and/or oversaturated, the highlight reconstruction engine 235 uses Equation 7 and/or Equation 8. In combination 725, if the red color channel 705 and the blue color channel 715 are overexposed and/or oversaturated, the highlight reconstruction engine 235 uses Equation 9 and/or Equation 10. In combination 725, if the green color channel 710 and the blue color channel 715 are overexposed and/or oversaturated, the highlight reconstruction engine 235 uses Equation 11 and/or Equation 12. In combination 730, if all three color channels (e.g., the red color channel 705, the green color channel 710, and the blue color channel 715) are overexposed and/or oversaturated, the highlight reconstruction engine 235 uses Equation 13, Equation 14, and/or Equation 15.

Figure 8:
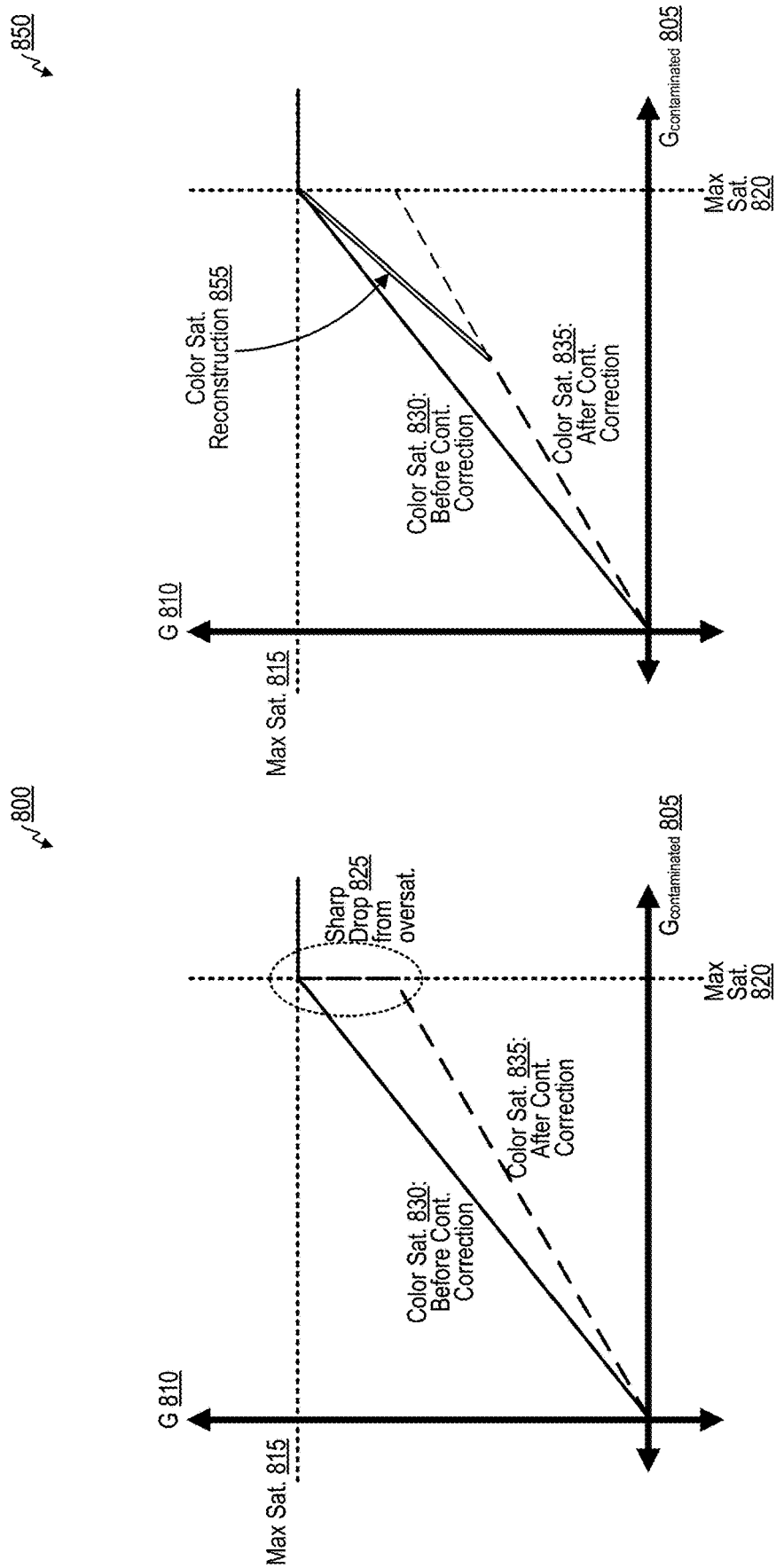
FIG. 8A is a conceptual diagram illustrating a graph of color saturation before and after contamination correction, without highlight reconstruction, in accordance with some examples.
FIG. 8B is a conceptual diagram illustrating a graph of color saturation before and after contamination correction, with highlight reconstruction, in accordance with some examples.

FIG. 8A is a conceptual diagram illustrating a graph 800 of color saturation before and after contamination correction, without highlight reconstruction. The graph 800 illustrates exposure and/or saturation for a green color channel, with the horizontal axis representing $G_{contaminated}$ 805 (e.g., from contaminated single-domain image data 220) and the vertical axis representing G 810 (from contamination-corrected single-domain image data 230). Dotted lines represent maximum saturation 815 and maximum saturation 820 along the two respective axes. A first line in the graph 800 represents the color saturation 830 for the green color channel before contamination correction (e.g., in the contaminated single-domain image data 220). A second line in the graph 800 represents the color saturation 835 for the green color channel after contamination correction (e.g., in the contamination-corrected single-domain image data 230). A sharp drop 825 at the maximum saturation 820 between the color saturation 830 and the color saturation 835 is caused by the overexposure and/or oversaturation in the green color channel. In some examples, the sharp drop 825 can be responsible for visual artifacts (e.g., visual artifact 930, the visual artifact 935, the visual artifact 1030, and the visual artifact 1035).

FIG. 8B is a conceptual diagram illustrating a graph 850 of color saturation before and after contamination correction, with highlight reconstruction. Relative to the graph 800, the graph 850 includes a new line segment representing color saturation reconstruction 855 (e.g., also referred to as highlight reconstruction). The line segment representing color saturation reconstruction 855 starts from a point along the second line representing the color saturation 835 after contamination correction and ends at the point along the first line representing the color saturation 830 before contamination correction at the maximum saturation 820. The color saturation reconstruction 855 prevents the sharp drop 825 in the graph 800, preventing visual artifacts. The color saturation reconstruction 855 illustrated in the graph 850 can be generated by the highlight reconstruction engine 235 using Equation 1, Equation 2, Equation 3, Equation 4, Equation 5, Equation 6, Equation 7, Equation 8, Equation 9, Equation 10, Equation 11, Equation 12, Equation 13, Equation 14, Equation 15, or a combination thereof. In some examples, a color correction strength is calculated based on the degree of the overexposure to ensure the smooth transition.

Figure 9:
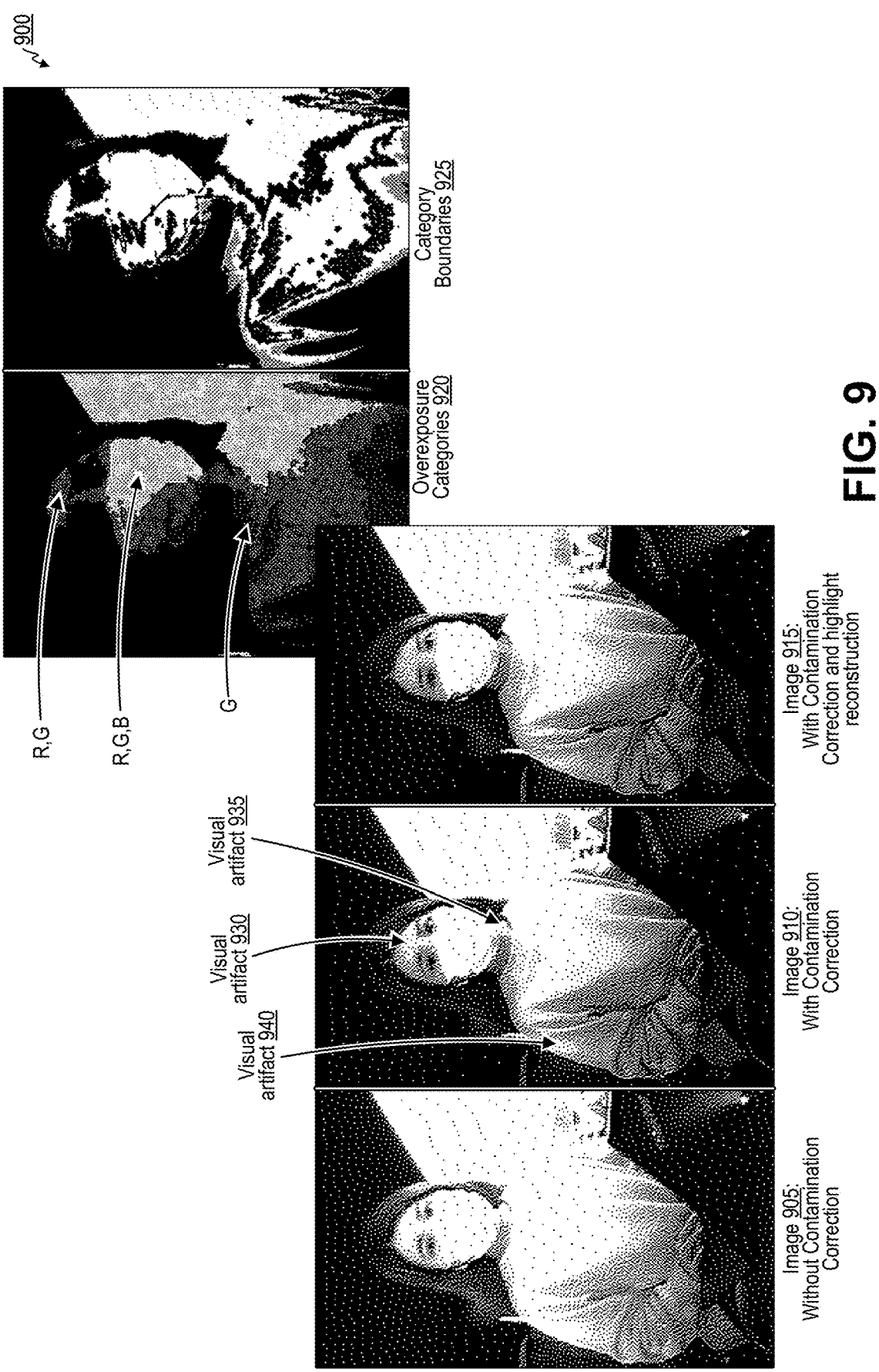
FIG. 9 is a conceptual diagram illustrating images of a person before contamination correction, after contamination correction, and after highlight reconstruction, in accordance with some examples.

FIG. 9 is a conceptual diagram 900 illustrating images of a person before contamination correction, after contamination correction, and after highlight reconstruction. A first image 905 of the person is without contamination correction, and is thus an example of the contaminated single-domain image data 220. A second image 910 of the person is with contamination correction but without highlight reconstruction, and is thus an example of the contamination-corrected single-domain image data 230. A third image 915 of the person is with contamination correction and with highlight reconstruction, and is thus an example of the output single-domain image data 240.

The conceptual diagram 900 also includes a map of overexposure categories 920 and a map of category boundaries 925 in the image 905, with different patterns representing areas in which various color channels include overexposure and/or oversaturation. For instance, a first area is marked "G" to represent the green color channel being overexposed and/or oversaturated, a second area is marked "R, G" to represent the red and green color channels both being overexposed and/or oversaturated, and a third area is marked "R, G, B" to represent the red and green and blue color channels all being overexposed and/or oversaturated.

The various color channel overexposures and/or oversaturations result in visual artifacts in the image 910. For instance, the visual artifact 930 represents a uniformly colored (e.g., yellow) area on the forehead of the person in the image 910. The visual artifact 935 represents a uniformly colored (e.g., yellow) area on the neck of the person in the image 910. The visual artifact 940 represents a uniformly colored (e.g., green) area on the sweater of the person in the image 910.

Figure 10:
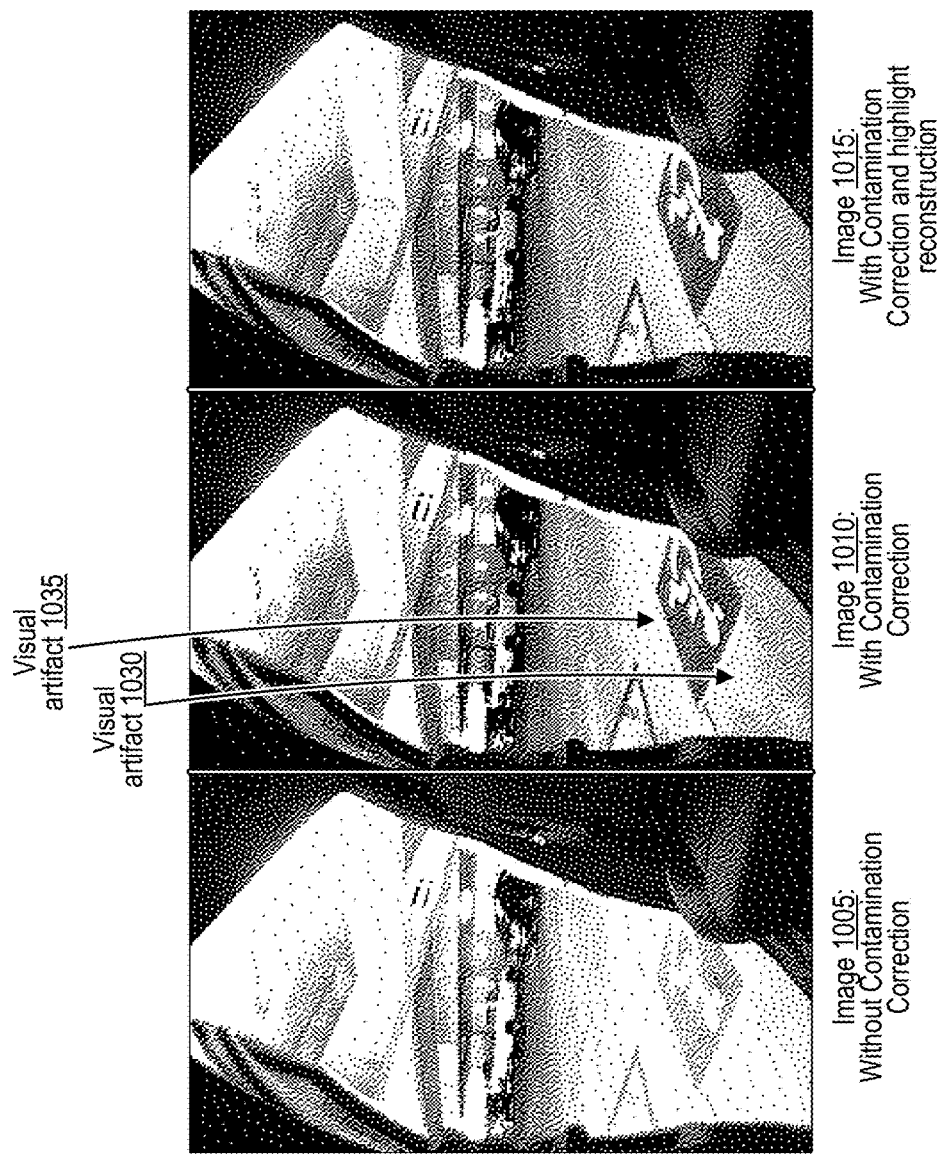
FIG. 10 is a conceptual diagram illustrating images of a parking garage before contamination correction, after contamination correction, and after highlight reconstruction, in accordance with some examples.

FIG. 10 is a conceptual diagram 1000 illustrating images of a parking garage before contamination correction, after contamination correction, and after highlight reconstruction. A first image 1005 of the parking garage is without contamination correction, and is thus an example of the contaminated single-domain image data 220. A second image 1010 of the parking garage is with contamination correction but without highlight reconstruction, and is thus an example of the contamination-corrected single-domain image data 230. A third image 1015 of the parking garage is with contamination correction and with highlight reconstruction, and is thus an example of the output single-domain image data 240.

The various color channel overexposures and/or oversaturations result in visual artifacts in the image 1010. For instance, the visual artifact 1030 and the visual artifact 1035 both represent uniformly colored (e.g., green) areas on the ground in the parking garage in the image 1010.

Figure 11:
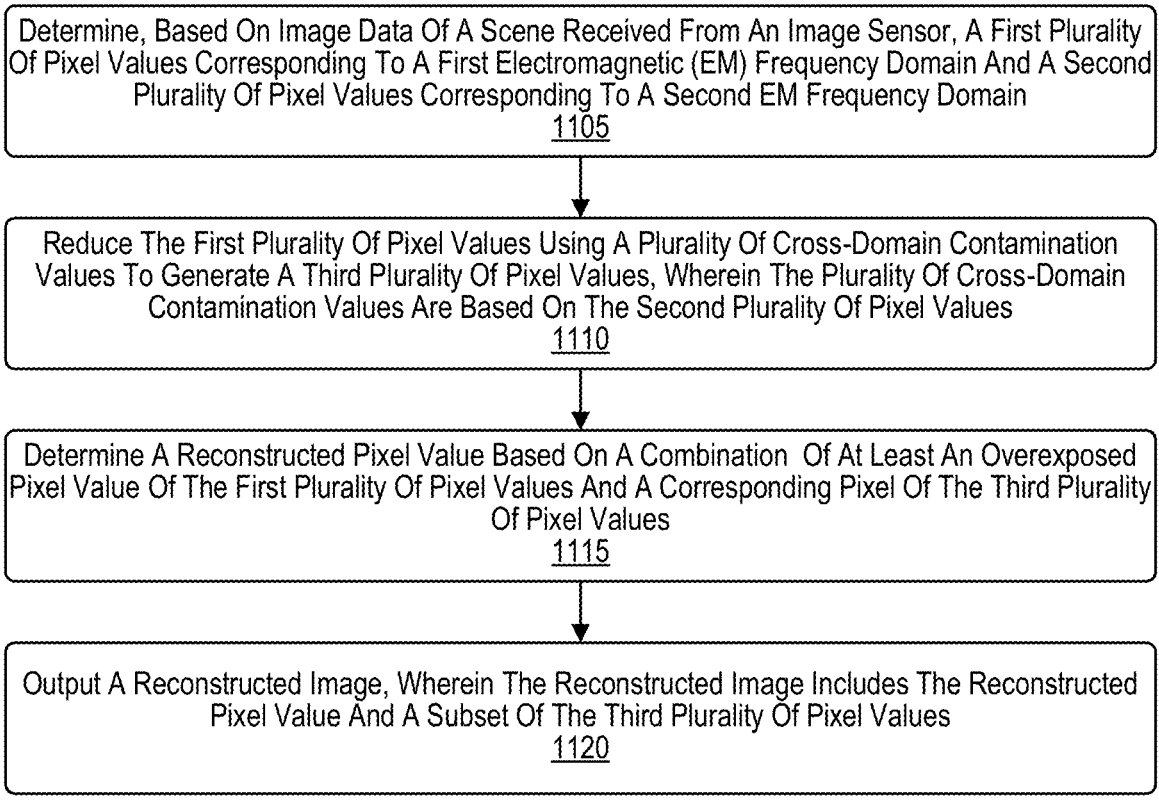
FIG. 11 is a flow diagram illustrating an imaging process, in accordance with some examples.

FIG. 11 is a flow diagram illustrating an imaging process 1100. The imaging process 1100 may be performed by an imaging system. In some examples, the imaging system can include, for example, the image capture and processing system 100, the image capture device 105A, the image processing device 105B, the image processor 150, the ISP 154, the host processor 152, the imaging system 200, the multi-domain image sensor 205, the remosaicing engine 215, the contamination correction engine 225, the highlight reconstruction engine 235, the output device(s) 245, the HMD 310, the mobile handset 410, the computing system 1200, the processor 1210, or a combination thereof.

At operation 1105, the imaging system is configured to, and can, determine, based on image data of a scene received from an image sensor, a first plurality of pixel values corresponding to a first electromagnetic (EM) frequency domain and a second plurality of pixel values corresponding to a second EM frequency domain.

Examples of the image sensor includes the image sensor 130, the multi-domain image sensor 205, the first camera 330A, the second camera 330B, the third camera 330C, the fourth camera 330D, the first camera 430A, the second camera 430B, the third camera 430C, the fourth camera 430D, an image sensor of an input device 1245, another image sensor described herein, another sensor described herein, or a combination thereof.

Examples of the image data of the scene includes an image of the scene 110 captured using the image sensor 130, the multi-domain image data 210, the contaminated single-domain image data 220, image(s) captured using the cameras 330A-330D, image(s) captured using the cameras 430A-430D, an image corresponding to graph 605, the image 905, the image 1005, an image captured using an image sensor of the input device 1245, or a combination thereof.

In some examples, the imaging system is configured to, and can, receive the image data from the image sensor before operation 1105. In some examples, the imaging system includes an image sensor connector that coupled and/or connects the image sensor to a remainder of the imaging system (e.g., including the processor and/or the memory of the imaging system). In some examples, the imaging system receives the image data from the image sensor by receiving the image data from, over, and/or using the image sensor connector.

In some aspects, the imaging system includes the image sensor. In some aspects, the image sensor is configured to capture both the image data based on incident light from the scene, the incident light including both light from the first EM frequency domain and light from the second EM frequency domain.

In some aspects, the first EM frequency domain includes at least a subset of a visible light EM frequency domain, and the second EM frequency domain includes at least a subset of an infrared (IR) EM frequency domain. In some aspects, the first EM frequency domain includes at least a subset of the IR EM frequency domain, and the second EM frequency domain includes at least a subset of the visible light EM frequency domain.

Examples of the first EM frequency domain and/or the second EM frequency domain include the first EM frequency domain 255, the second EM frequency domain 265, the radio EM frequency domain, the microwave EM frequency domain, the infrared (IR) EM frequency domain, the visible light (VL) EM frequency domain, the ultraviolet (UV) EM frequency domain, the X-Ray EM frequency domain, the gamma ray EM frequency domain, the red EM frequency domain, the green EM frequency domain, the blue EM frequency domain, the NIR EM frequency domain, another EM frequency domain described herein, a subset of any of these, or a combination thereof.

At operation 1110, the imaging system is configured to, and can, reduce the first plurality of pixel values using a plurality of cross-domain contamination values to generate a third plurality of pixel values. The plurality of cross-domain contamination values are based on the second plurality of pixel values. In some examples, operation 1110 is performed using the contamination correction engine 225.

For instance, in the context of FIG. 2, the contamination correction engine 225 reduces a first plurality of pixel values in the contaminated single-domain image data 220 corresponding to the first EM frequency domain 255 by cross-domain contamination values corresponding to the second EM frequency domain 265 to generate the contamination corrected single-domain image data 230 (e.g., the third plurality of pixel values). In the context of FIG. 5, the second plurality of pixel values and/or the cross-domain contamination values correspond to the values for the infrared EM frequency domain 530, while the first plurality of pixel values correspond to the values for the red color channel 515, the green color channel 520, and/or the blue color channel 525, respectively. In the context of FIG. 6, the graph 610 and the graph 615 both illustrate examples of the reduction, with the second plurality of pixel values and/or the cross-domain contamination values corresponding to the IR values, and the first plurality of pixel values corresponding to the red, green, and/or blue values. In the context of FIGS. 8A-8B, the change from the color saturation 830 before contamination correction to the color saturation 835 after contamination correction is an example of the reduction. In the context of FIG. 9, the change from the image 905 without contamination correction to the image 910 after contamination correction is an example of the reduction. In the context of FIG. 10, the change from the image 1005 without contamination correction to the image 1010 after contamination correction is an example of the reduction.

In some aspects, the plurality of cross-domain contamination values are based on a combination of the second plurality of pixel values and at least one corresponding coefficient. Examples of the at least one corresponding coefficient include the coefficients a, b, and c of Equations 1, 2, and 3. In some aspects, the combination of the second plurality of pixel values and at least one corresponding coefficient is a product of the second plurality of pixel values and at least one corresponding coefficient, as in Equations 1, 2, and 3.

At operation 1115, the imaging system is configured to, and can, determine a reconstructed pixel value based on a combination of at least an overexposed pixel value of the first plurality of pixel values and a corresponding pixel of the third plurality of pixel values. In some examples, operation 1115 is performed using the highlight reconstruction engine 235. The overexposed pixel value may also be referred to as the oversaturated pixel value. Examples of the combination include the functions recovery$_1$( ), recovery$_2$( ), and/or recovery$_3$( ) in Equations 4-15.

In some aspects, the combination of operation 1115 is a weighted average of at least the overexposed pixel value of the first plurality of pixel values and the corresponding pixel of the third plurality of pixel values. Examples of the weighted average include the functions recovery$_1$( ), recovery$_2$( ), and/or recovery$_3$( ) in Equations 4-15.

In some aspects, the imaging system is configured to, and can, determine, based on the image data, a fourth plurality of pixel values corresponding to a third EM frequency domain. In such aspects, the combination of operation 1115 is of at least the overexposed pixel value, the corresponding pixel of the third plurality of pixel values, and a corresponding pixel of the fourth plurality of pixel values. Examples of the combination include Equations 7-15.

In some aspects, a position of the corresponding pixel in a frame that includes the third plurality of pixel values matches a position of the overexposed pixel value in a frame that includes the first plurality of pixel values. For instance, if the overexposed pixel value is at a position indicated by coordinates (row, column) in the frame, then the corresponding pixel in the frame is either also at the position indicated by coordinates (row, column) in the frame, at an adjacent position that is adjacent to position indicated by coordinates (row, column) in the frame, at a nearby position that is within a threshold distance from the position indicated by coordinates (row, column) in the frame, or a combination thereof. For instance, an adjacent position may be indicated by coordinates (row±1, column±1), coordinates (row±1, column), or coordinates (row, column±1). The threshold distance for the nearby position may be a distance of 1 pixel, 2 pixels, 3 pixels, 4 pixels, 5 pixels, 6 pixels, 7 pixels, 8 pixels, 9 pixels, 10 pixels, or more than 10 pixels.

In some aspects, the imaging system is configured to, and can, determine that the overexposed pixel value exceeds an overexposure threshold to determine that the overexposed pixel value is overexposed. The overexposure threshold can be a maximum exposure value, such as the value marked "1" in FIG. 6, the maximum saturation 815, the maximum saturation 820, or a combination thereof. The overexposure threshold can be less than a maximum exposure value.

At operation 1120, the imaging system is configured to, and can, output a reconstructed image, wherein the reconstructed image includes the reconstructed pixel value and a subset of the third plurality of pixel values. In some examples, the imaging system is configured to, and can, generate the reconstructed image (to include the reconstructed pixel value and the subset of the third plurality of pixel values) before outputting the reconstructed image at operation 1120.

For instance, in the context of FIG. 2, the highlight reconstruction engine 235 determines the reconstructed pixel value to be part of the output single-domain image data 220 based on an overexposed pixel value in the multi-domain image data 210, the contaminated single-domain image data 220 and/or the contamination-corrected single-domain image data 220. The output single-domain image data 220 is an example of the reconstructed image. In the context of FIG. 6, the green value is an example of the overexposed pixel value, while the red, blue, and/or IR values are examples of the corresponding pixel(s) of the third plurality of pixel values. Graph 620 illustrates an example determining the reconstructed pixel value, with the highlight correction added to the green value (the overexposed pixel value) based on the corresponding pixel(s) of the third plurality of pixel values (the red, blue, and/or IR pixel values). In the context of FIG. 7, the imaging system can determine the reconstructed pixel value using the combination 720, the combination 725, the combination 730, and/or the combination 735, based on which color channel(s) the overexposed pixel value is overexposed in. In the context of FIGS. 8A-8B, the imaging system can determine the reconstructed pixel value along the line representing the color saturation reconstruction 855. In the context of FIG. 9, the change from the image 910 without highlight reconstruction to the image 915 after highlight reconstruction is an example of the determination of the reconstructed pixel value, and/or generation and output of the reconstructed image. The image 915 is an example of the reconstructed image. The overexposure categories 920 and category boundaries 925 indicate overexposed pixel values in the image 905 and/or the image 910, that are reconstructed in the image 915. In the context of FIG. 10, the change from the image 1010 without highlight reconstruction to the image 1015 after highlight reconstruction is an example of the determination of the reconstructed pixel value, and/or generation and output of the reconstructed image. The image 1015 is an example of the reconstructed image.

In some aspects, the first EM frequency domain includes at least a subset of a first color of a visible light EM frequency domain, wherein the third EM frequency domain includes at least a subset of a second color of the visible light EM frequency domain, and wherein the second EM frequency domain includes at least a subset of an infrared (IR) EM frequency domain. In some aspects, the first EM frequency domain includes at least a subset of an infrared (IR) EM frequency domain, and wherein the second EM frequency domain includes at least a subset of a visible light EM frequency domain. Examples of the first color and the second color include red, green, blue, cyan, yellow, magenta, or a combination thereof. For instance, in the context of FIGS. 5, 6, and 7, examples of the first color and the second color include red, green, and blue.

In some aspects, the imaging system is configured to, and can, detect at least one object in the reconstructed image, the image data, or a combination thereof. In a first illustrative example, in response to detecting the at least one object, the imaging system is configured to, and can, transmit a vehicle control signal to a vehicle control device of a vehicle, causing the vehicle control device to route the vehicle based on detection of the at least one object. For instance, if the object is a pedestrian, another vehicle, a tree, a structure, or another obstacle, the vehicle control signal can cause the vehicle control device to route the vehicle away from or around the object, to avoid the object. On the other hand, if the object is a lane, a street, lane marking of a lane, an exit, a turn, a speed bump, or another indicator of a thoroughfare, the vehicle control signal can cause the vehicle control device to route the vehicle toward, along, or within the object. In a second illustrative example, in response to detecting the at least one object, the imaging system is configured to, and can, transmit an alert signal to a vehicle output device of a vehicle, cause the vehicle output device to output an alert that is indicative of detection of the at least one object. For instance, if the object is a pedestrian, another vehicle, a tree, a structure, or another obstacle, the vehicle alert signal can cause the vehicle output device to alert the driver, operator, and/or passenger(s) of the vehicle to the detected presence of the object, for instance so that the driver and/or operator can route the vehicle around or away from the object to avoid the object. On the other hand, if the object is a lane, a street, lane marking of a lane, an exit, a turn, a speed bump, or another indicator of a thoroughfare, the vehicle alert signal can cause the vehicle output device to alert the driver, operator, and/or passenger(s) of the vehicle to the detected presence of the object, for instance so that the driver and/or operator can route the toward, along, or within the object.

In some aspects, the imaging system includes a display (e.g., the output device(s) 245, the display(s) 340, the display 440, and/or the output device 1235). The imaging system is configured to, and can, cause the display to display the reconstructed image.

In some aspects, the imaging system includes a communication transceiver (e.g., the output device(s) 245, the output device 1235, and/or the communication interface 1240). The imaging system is configured to, and can, cause the communication transceiver to transmit the reconstructed image to a recipient device (e.g., another imaging system, an image capture and processing system 100, an imaging system 200, an HMD 310, a mobile handset 410, a computing system 1200, or a combination thereof).

In some aspects, the imaging system is configured to, and can, reduce the second plurality of pixel values using a second plurality of cross-domain contamination values to generate a fourth plurality of pixel values. The second plurality of cross-domain contamination values are based on the first plurality of pixel values. The imaging system can determine a second reconstructed pixel value based on a combination of at least a second overexposed pixel value of the second plurality of pixel values and a corresponding pixel of the fourth plurality of pixel values. The imaging system can output a second reconstructed image, wherein the second reconstructed image includes the second reconstructed pixel value and a subset of the fourth plurality of pixel values. These operations mirror operations 1110, 1115, and 1120, but reverse the first plurality of pixel values corresponding to the first EM frequency domain and the second plurality of pixel values corresponding to the second EM frequency domain. Thus, the second reconstructed image is in the second EM frequency domain, with contamination from the first EM frequency domain reduced and highlights reconstructed.

In some examples, the imaging system can include: means for determining, based on image data of a scene received from an image sensor, a first plurality of pixel values corresponding to a first electromagnetic (EM) frequency domain and a second plurality of pixel values corresponding to a second EM frequency domain; means for reducing the first plurality of pixel values using a plurality of cross-domain contamination values to generate a third plurality of pixel values, wherein the plurality of cross-domain contamination values are based on the second plurality of pixel values; means for determining a reconstructed pixel value based on a combination of at least an overexposed pixel value of the first plurality of pixel values and a corresponding pixel of the third plurality of pixel values; and means for outputting a reconstructed image, wherein the reconstructed image includes the reconstructed pixel value and a subset of the third plurality of pixel values.

In some examples, the means for determining the first and second plurality of pixel values includes the image capture and processing system 100, the image capture device 105A, the image processing device 105B, the image sensor 130, the image processor 150, the ISP 154, the host processor 152, the imaging system 200, the multi-domain image sensor 205, the remosaicing engine 215, the contamination correction engine 225, the first camera 330A, the second camera 330B, the third camera 330C, the fourth camera 330D, the first camera 430A, the second camera 430B, the third camera 430C, the fourth camera 430D, an image sensor of an input device 1245, another image sensor described herein, another sensor described herein, or a combination thereof.

In some examples, the means for reducing the first plurality of pixel values using the plurality of cross-domain contamination values includes the image capture and processing system 100, image processing device 105B, the image processor 150, the ISP 154, the host processor 152, the imaging system 200, the contamination correction engine 225, the HMD 310, the mobile handset 410, the computing system 1200, the processor 1210, or a combination thereof.

In some examples, the means for determining the reconstructed pixel value includes the image capture and processing system 100, image processing device 105B, the image processor 150, the ISP 154, the host processor 152, the imaging system 200, the highlight reconstruction engine 235, the HMD 310, the mobile handset 410, the computing system 1200, the processor 1210, or a combination thereof.

In some examples, the means for outputting the reconstructed image includes the image capture and processing system 100, image processing device 105B, the image processor 150, the ISP 154, the host processor 152, the imaging system 200, the highlight reconstruction engine 235, the output device(s) 245, the display(s) 340, the display 440, the computing system 1200, the output device 1235, the communication interface 1240, or a combination thereof.

In some examples, the processes described herein (e.g., the respective processes of FIGS. 1, 2, the imaging process 1100, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200, the multi-domain image sensor 205, the remosaicing engine 215, the contamination correction engine 225, the highlight reconstruction engine 235, the output device(s) 245, the HMD 310, the mobile handset 410, the imaging system that performs the imaging process 1100, the computing system 1200, the processor 1210, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
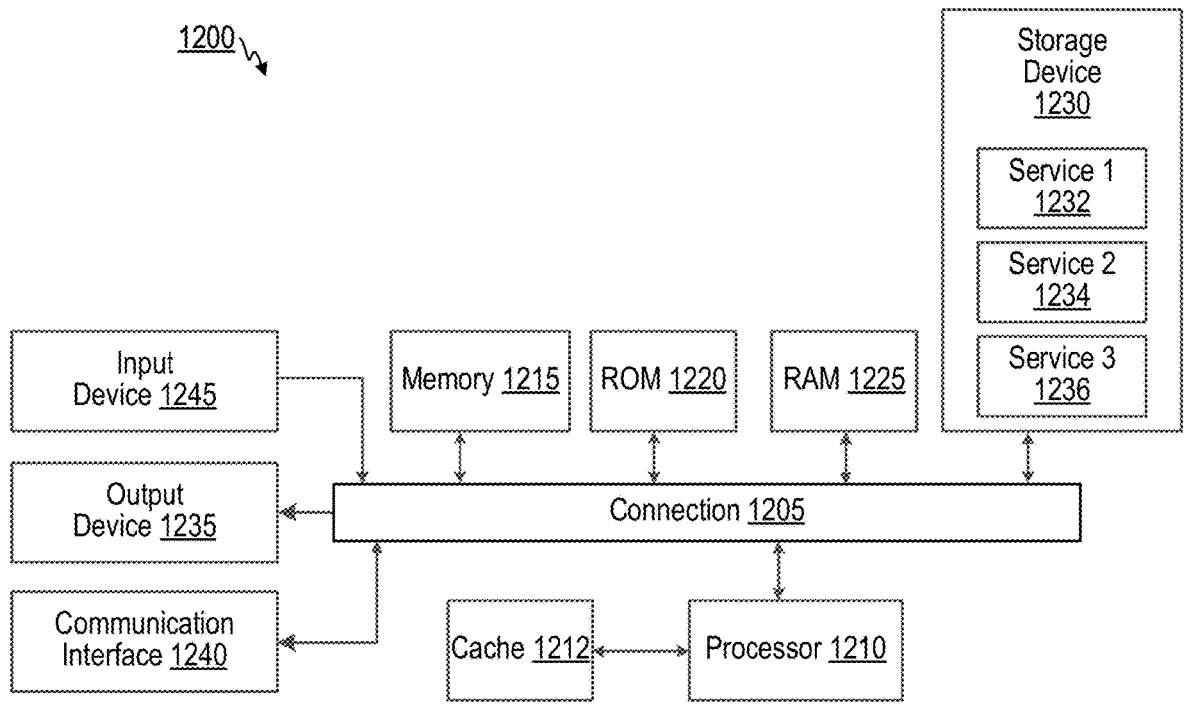
FIG. 12 is a diagram illustrating an example of a computing system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1202.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, wellknown circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: determine, based on image data of a scene received from an image sensor, a first plurality of pixel values corresponding to a first electromagnetic (EM) frequency domain and a second plurality of pixel values corresponding to a second EM frequency domain; reduce the first plurality of pixel values using a plurality of cross-domain contamination values to generate a third plurality of pixel values, wherein the plurality of cross-domain contamination values are based on the second plurality of pixel values; determine a reconstructed pixel value based on a combination of at least an overexposed pixel value of the first plurality of pixel values and a corresponding pixel of the third plurality of pixel values; and output a reconstructed image, wherein the reconstructed image includes the reconstructed pixel value and a subset of the third plurality of pixel values.

Aspect 2. The apparatus of Aspect 1, wherein the plurality of cross-domain contamination values are based on a combination of the second plurality of pixel values and at least one corresponding coefficient.

Aspect 3. The apparatus of Aspect 2, wherein the combination of the second plurality of pixel values and at least one corresponding coefficient is a product of the second plurality of pixel values and at least one corresponding coefficient.

Aspect 4. The apparatus of any of Aspects 1 to 3, wherein the combination is a weighted average of at least the overexposed pixel value of the first plurality of pixel values and the corresponding pixel of the third plurality of pixel values.

Aspect 5. The apparatus of any of Aspects 1 to 4, wherein a position of the corresponding pixel in a frame that includes the third plurality of pixel values matches a position of the overexposed pixel value in a frame that includes the first plurality of pixel values.

Aspect 6. The apparatus of any of Aspects 1 to 5, the at least one processor configured to: determine that the overexposed pixel value exceeds an overexposure threshold to determine that the overexposed pixel value is overexposed.

Aspect 7. The apparatus of any of Aspects 1 to 6, wherein the first EM frequency domain includes at least a subset of a visible light EM frequency domain, and wherein the second EM frequency domain includes at least a subset of an infrared (IR) EM frequency domain.

Aspect 8. The apparatus of any of Aspects 1 to 7, the at least one processor configured to: determine, based on the image data, a fourth plurality of pixel values corresponding to a third EM frequency domain, wherein the combination is of at least the overexposed pixel value, the corresponding pixel of the third plurality of pixel values, and a corresponding pixel of the fourth plurality of pixel values.

Aspect 9. The apparatus of Aspect 8, wherein the first EM frequency domain includes at least a subset of a first color of a visible light EM frequency domain, wherein the third EM frequency domain includes at least a subset of a second color of the visible light EM frequency domain, and wherein the second EM frequency domain includes at least a subset of an infrared (IR) EM frequency domain.

Aspect 10. The apparatus of any of Aspects 1 to 9, wherein the first EM frequency domain includes at least a subset of an infrared (IR) EM frequency domain, and wherein the second EM frequency domain includes at least a subset of a visible light EM frequency domain.

Aspect 11. The apparatus of any of Aspects 1 to 10, the at least one processor configured to: reduce the second plurality of pixel values using a second plurality of cross-domain contamination values to generate a fourth plurality of pixel values, wherein the second plurality of cross-domain contamination values are based on the first plurality of pixel values; determine a second reconstructed pixel value based on a combination of at least a second overexposed pixel value of the second plurality of pixel values and a corresponding pixel of the fourth plurality of pixel values; and output a second reconstructed image, wherein the second reconstructed image includes the second reconstructed pixel value and a subset of the fourth plurality of pixel values.

Aspect 12. The apparatus of any of Aspects 1 to 11, further comprising: the image sensor.

Aspect 13. The apparatus of any of Aspects 1 to 12, wherein the image sensor is configured to capture both the image data based on incident light from the scene, the incident light including both light from the first EM frequency domain and light from the second EM frequency domain.
Aspect 14. The apparatus of any of Aspects 1 to 13, the at least one processor configured to: detect at least one object in the reconstructed image; and transmit a vehicle control signal to a vehicle control device of a vehicle, the vehicle control signal configured to cause the vehicle control device to route the vehicle based on detection of the at least one object.
Aspect 15. The apparatus of any of Aspects 1 to 14, the at least one processor configured to: detect at least one object in the reconstructed image; and transmit an alert signal to a vehicle output device of a vehicle, the alert signal configured to cause the vehicle output device to output an alert that is indicative of detection of the at least one object.
Aspect 16. The apparatus of any of Aspects 1 to 15, further comprising: a display configured to display the reconstructed image.
Aspect 17. The apparatus of any of Aspects 1 to 16, further comprising: a communication transceiver configured to transmit the reconstructed image to a recipient device.
Aspect 18. The apparatus of any of Aspects 1 to 17, wherein the apparatus includes at least one of a head-mounted display (HMD), a mobile handset, or a wireless communication device.
Aspect 19. A method for imaging, the method comprising: determining, based on image data of a scene received from an image sensor, a first plurality of pixel values corresponding to a first electromagnetic (EM) frequency domain and a second plurality of pixel values corresponding to a second EM frequency domain; reducing the first plurality of pixel values using a plurality of cross-domain contamination values to generate a third plurality of pixel values, wherein the plurality of cross-domain contamination values are based on the second plurality of pixel values; determining a reconstructed pixel value based on a combination of at least an overexposed pixel value of the first plurality of pixel values and a corresponding pixel of the third plurality of pixel values; and outputting a reconstructed image, wherein the reconstructed image includes the reconstructed pixel value and a subset of the third plurality of pixel values.
Aspect 20. The method of Aspect 19, wherein the plurality of cross-domain contamination values are based on a combination of the second plurality of pixel values and at least one corresponding coefficient.
Aspect 21. The method of Aspect 20, wherein the combination of the second plurality of pixel values and at least one corresponding coefficient is a product of the second plurality of pixel values and at least one corresponding coefficient.
Aspect 22. The method of any of Aspects 19 to 21, wherein the combination is a weighted average of at least the overexposed pixel value of the first plurality of pixel values and the corresponding pixel of the third plurality of pixel values.
Aspect 23. The method of any of Aspects 19 to 22, wherein a position of the corresponding pixel in a frame that includes the third plurality of pixel values matches a position of the overexposed pixel value in a frame that includes the first plurality of pixel values.
Aspect 24. The method of any of Aspects 19 to 23, further comprising: determining that the overexposed pixel value exceeds an overexposure threshold to determine that the overexposed pixel value is overexposed.
Aspect 25. The method of any of Aspects 19 to 24, wherein the first EM frequency domain includes at least a subset of a visible light EM frequency domain, and wherein the second EM frequency domain includes at least a subset of an infrared (IR) EM frequency domain.
Aspect 26. The method of any of Aspects 19 to 25, further comprising: determining, based on the image data, a fourth plurality of pixel values corresponding to a third EM frequency domain, wherein the combination is of at least the overexposed pixel value, the corresponding pixel of the third plurality of pixel values, and a corresponding pixel of the fourth plurality of pixel values.
Aspect 27. The method of Aspect 26, wherein the first EM frequency domain includes at least a subset of a first color of a visible light EM frequency domain, wherein the third EM frequency domain includes at least a subset of a second color of the visible light EM frequency domain, and wherein the second EM frequency domain includes at least a subset of an infrared (IR) EM frequency domain.
Aspect 28. The method of any of Aspects 19 to 27, wherein the first EM frequency domain includes at least a subset of an infrared (IR) EM frequency domain, and wherein the second EM frequency domain includes at least a subset of a visible light EM frequency domain.
Aspect 29. The method of any of Aspects 19 to 28, further comprising: reducing the second plurality of pixel values using a second plurality of cross-domain contamination values to generate a fourth plurality of pixel values, wherein the second plurality of cross-domain contamination values are based on the first plurality of pixel values; determining a second reconstructed pixel value based on a combination of at least a second overexposed pixel value of the second plurality of pixel values and a corresponding pixel of the fourth plurality of pixel values; and outputting a second reconstructed image, wherein the second reconstructed image includes the second reconstructed pixel value and a subset of the fourth plurality of pixel values.
Aspect 30. The method of any of Aspects 19 to 29, wherein the method is performed using an apparatus that includes the image sensor.
Aspect 31. The method of any of Aspects 19 to 30, wherein the image sensor is configured to capture both the image data based on incident light from the scene, the incident light including both light from the first EM frequency domain and light from the second EM frequency domain.
Aspect 32. The method of any of Aspects 19 to 31, further comprising: detecting at least one object in the reconstructed image; and transmit a vehicle control signal to a vehicle control device of a vehicle, the vehicle control signal configured to cause the vehicle control device to route the vehicle based on detection of the at least one object.
Aspect 33. The method of any of Aspects 19 to 32, further comprising: detecting at least one object in the reconstructed image; and transmitting an alert signal to a vehicle output device of a vehicle, the alert signal configured to cause the vehicle output device to output an alert that is indicative of detection of the at least one object.

Aspect 34. The method of any of Aspects 19 to 33, further comprising: causing a display to display the reconstructed image.

Aspect 35. The method of any of Aspects 19 to 34, further comprising: causing a communication transceiver to transmit the reconstructed image to a recipient device.

Aspect 36. The method of any of Aspects 19 to 35, wherein the method is performed using an apparatus that includes at least one of a head-mounted display (HMD), a mobile handset, or a wireless communication device.

Aspect 37: A non-transitory computer-readable medium having stored thereon instructions that, when executed by one or more processors, cause the one or more processors to: determine, based on image data of a scene received from an image sensor, a first plurality of pixel values corresponding to a first electromagnetic (EM) frequency domain and a second plurality of pixel values corresponding to a second EM frequency domain; reduce the first plurality of pixel values using a plurality of cross-domain contamination values to generate a third plurality of pixel values, wherein the plurality of cross-domain contamination values are based on the second plurality of pixel values; determine a reconstructed pixel value based on a combination of at least an overexposed pixel value of the first plurality of pixel values and a corresponding pixel of the third plurality of pixel values; and output a reconstructed image, wherein the reconstructed image includes the reconstructed pixel value and a subset of the third plurality of pixel values.

Aspect 38: The non-transitory computer-readable medium of Aspect 37, further comprising operations according to any of Aspects 2 to 18, and/or any of Aspects 20 to 36.

Aspect 39: An apparatus for image processing, the apparatus comprising: means for determining, based on image data of a scene received from an image sensor, a first plurality of pixel values corresponding to a first electromagnetic (EM) frequency domain and a second plurality of pixel values corresponding to a second EM frequency domain; means for reducing the first plurality of pixel values using a plurality of cross-domain contamination values to generate a third plurality of pixel values, wherein the plurality of cross-domain contamination values are based on the second plurality of pixel values; means for determining a reconstructed pixel value based on a combination of at least an overexposed pixel value of the first plurality of pixel values and a corresponding pixel of the third plurality of pixel values; and means for outputting a reconstructed image, wherein the reconstructed image includes the reconstructed pixel value and a subset of the third plurality of pixel values.

Aspect 20. The method of Aspect 19, wherein the plurality of cross-domain contamination values are based on a combination of the second plurality of pixel values and at least one corresponding coefficient.

Aspect 40: The apparatus of Aspect 39, further comprising means for performing operations according to any of Aspects 2 to 18, and/or any of Aspects 20 to 36.

What is claimed is:

1. An apparatus for imaging, the apparatus comprising:
at least one memory; and
at least one processor coupled to the at least one memory, the at least one processor configured to:
   determine, based on image data of a scene received from an image sensor, a first plurality of pixel values corresponding to a first electromagnetic (EM) frequency domain and a second plurality of pixel values corresponding to a second EM frequency domain;
   reduce the first plurality of pixel values using a plurality of cross-domain contamination values to generate a third plurality of pixel values, wherein the plurality of cross-domain contamination values are based on the second plurality of pixel values;
   determine a reconstructed pixel value based on a combination of at least an overexposed pixel value of the first plurality of pixel values and a corresponding pixel of the third plurality of pixel values; and
   output a reconstructed image, wherein the reconstructed image includes the reconstructed pixel value and a subset of the third plurality of pixel values.

2. The apparatus of claim 1, wherein the plurality of cross-domain contamination values are based on a combination of the second plurality of pixel values and at least one corresponding coefficient.

3. The apparatus of claim 2, wherein the combination of the second plurality of pixel values and at least one corresponding coefficient is a product of the second plurality of pixel values and at least one corresponding coefficient.

4. The apparatus of claim 1, wherein the combination is a weighted average of at least the overexposed pixel value of the first plurality of pixel values and the corresponding pixel of the third plurality of pixel values.

5. The apparatus of claim 1, wherein a position of the corresponding pixel in a frame that includes the third plurality of pixel values matches a position of the overexposed pixel value in a frame that includes the first plurality of pixel values.

6. The apparatus of claim 1, the at least one processor configured to:
   determine that the overexposed pixel value exceeds an overexposure threshold to determine that the overexposed pixel value is overexposed.

7. The apparatus of claim 1, wherein the first EM frequency domain includes at least a subset of a visible light EM frequency domain, and wherein the second EM frequency domain includes at least a subset of an infrared (IR) EM frequency domain.

8. The apparatus of claim 1, the at least one processor configured to:
   determine, based on the image data, a fourth plurality of pixel values corresponding to a third EM frequency domain, wherein the combination is of at least the overexposed pixel value, the corresponding pixel of the third plurality of pixel values, and a corresponding pixel of the fourth plurality of pixel values.

9. The apparatus of claim 8, wherein the first EM frequency domain includes at least a subset of a first color of a visible light EM frequency domain, wherein the third EM frequency domain includes at least a subset of a second color of the visible light EM frequency domain, and wherein the second EM frequency domain includes at least a subset of an infrared (IR) EM frequency domain.

10. The apparatus of claim 1, wherein the first EM frequency domain includes at least a subset of an infrared (IR) EM frequency domain, and wherein the second EM frequency domain includes at least a subset of a visible light EM frequency domain.

11. The apparatus of claim 1, the at least one processor configured to:
reduce the second plurality of pixel values using a second plurality of cross-domain contamination values to generate a fourth plurality of pixel values, wherein the second plurality of cross-domain contamination values are based on the first plurality of pixel values;
determine a second reconstructed pixel value based on a combination of at least a second overexposed pixel value of the second plurality of pixel values and a corresponding pixel of the fourth plurality of pixel values; and
output a second reconstructed image, wherein the second reconstructed image includes the second reconstructed pixel value and a subset of the fourth plurality of pixel values.

12. The apparatus of claim 1, wherein the image sensor is configured to capture both the image data based on incident light from the scene, the incident light including both light from the first EM frequency domain and light from the second EM frequency domain.

13. The apparatus of claim 1, the at least one processor configured to:
detect at least one object in the reconstructed image; and
transmit a vehicle control signal to a vehicle control device of a vehicle, the vehicle control signal configured to cause the vehicle control device to route the vehicle based on detection of the at least one object.

14. The apparatus of claim 1, the at least one processor configured to:
detect at least one object in the reconstructed image; and
transmit an alert signal to a vehicle output device of a vehicle, the alert signal configured to cause the vehicle output device to output an alert that is indicative of detection of the at least one object.

15. The apparatus of claim 1, further comprising:
a display configured to display the reconstructed image.

16. The apparatus of claim 1, further comprising:
a communication transceiver configured to transmit the reconstructed image to a recipient device.

17. The apparatus of claim 1, wherein the apparatus includes at least one of a head-mounted display (HMD), a mobile handset, or a wireless communication device.

18. A method for imaging, the method comprising:
determining, based on image data of a scene received from an image sensor, a first plurality of pixel values corresponding to a first electromagnetic (EM) frequency domain and a second plurality of pixel values corresponding to a second EM frequency domain;
reducing the first plurality of pixel values using a plurality of cross-domain contamination values to generate a third plurality of pixel values, wherein the plurality of cross-domain contamination values are based on the second plurality of pixel values;
determining a reconstructed pixel value based on a combination of at least an overexposed pixel value of the first plurality of pixel values and a corresponding pixel of the third plurality of pixel values; and
outputting a reconstructed image, wherein the reconstructed image includes the reconstructed pixel value and a subset of the third plurality of pixel values.

19. The method of claim 18, wherein the plurality of cross-domain contamination values are based on a combination of the second plurality of pixel values and at least one corresponding coefficient.

20. The method of claim 18, wherein the combination is a weighted average of at least the overexposed pixel value of the first plurality of pixel values and the corresponding pixel of the third plurality of pixel values.

21. The method of claim 18, wherein a position of the corresponding pixel in a frame that includes the third plurality of pixel values matches a position of the overexposed pixel value in a frame that includes the first plurality of pixel values.

22. The method of claim 18, further comprising:
determining that the overexposed pixel value exceeds an overexposure threshold to determine that the overexposed pixel value is overexposed.

23. The method of claim 18, wherein the first EM frequency domain includes at least a subset of a visible light EM frequency domain, and wherein the second EM frequency domain includes at least a subset of an infrared (IR) EM frequency domain.

24. The method of claim 18, further comprising:
determining, based on the image data, a fourth plurality of pixel values corresponding to a third EM frequency domain, wherein the combination is of at least the overexposed pixel value, the corresponding pixel of the third plurality of pixel values, and a corresponding pixel of the fourth plurality of pixel values.

25. The method of claim 18, wherein the first EM frequency domain includes at least a subset of an infrared (IR) EM frequency domain, and wherein the second EM frequency domain includes at least a subset of a visible light EM frequency domain.

26. The method of claim 18, further comprising:
reducing the second plurality of pixel values using a second plurality of cross-domain contamination values to generate a fourth plurality of pixel values, wherein the second plurality of cross-domain contamination values are based on the first plurality of pixel values;
determining a second reconstructed pixel value based on a combination of at least a second overexposed pixel value of the second plurality of pixel values and a corresponding pixel of the fourth plurality of pixel values; and
outputting a second reconstructed image, wherein the second reconstructed image includes the second reconstructed pixel value and a subset of the fourth plurality of pixel values.

27. The method of claim 18, wherein the image sensor is configured to capture both the image data based on incident light from the scene, the incident light including both light from the first EM frequency domain and light from the second EM frequency domain.

28. The method of claim 18, further comprising:
detecting at least one object in the reconstructed image; and
transmit a vehicle control signal to a vehicle control device of a vehicle, the vehicle control signal configured to cause the vehicle control device to route the vehicle based on detection of the at least one object.

29. The method of claim 18, further comprising:
detecting at least one object in the reconstructed image; and
transmitting an alert signal to a vehicle output device of a vehicle, the alert signal configured to cause the vehicle output device to output an alert that is indicative of detection of the at least one object.

* * * * *